(12) United States Patent
Becerra

(10) Patent No.: US 11,598,689 B1
(45) Date of Patent: Mar. 7, 2023

(54) METHOD OF DETECTING AND IDENTIFYING UNDERGROUND LEAKING PIPES

(71) Applicant: Philip Becerra, Ventura, CA (US)

(72) Inventor: Philip Becerra, Ventura, CA (US)

( * ) Notice: Subject to any disclaimer, the term of this patent is extended or adjusted under 35 U.S.C. 154(b) by 0 days.

(21) Appl. No.: 17/745,976

(22) Filed: May 17, 2022

Related U.S. Application Data

(60) Provisional application No. 63/271,202, filed on Oct. 24, 2021.

(51) Int. Cl.
| | | |
|---|---|---|
| *G01K 13/00* | (2021.01) | |
| *G01M 3/00* | (2006.01) | |
| *G01K 13/02* | (2021.01) | |
| *G01M 3/24* | (2006.01) | |
| *G01N 25/72* | (2006.01) | |

(52) U.S. Cl.
CPC ........... *G01M 3/002* (2013.01); *G01K 13/026* (2021.01); *G01M 3/243* (2013.01); *G01N 25/72* (2013.01)

(58) Field of Classification Search
CPC .... G01M 3/002; G01M 3/243; G01K 13/026; F17D 5/02; F17D 5/06; F17D 5/00; F17D 3/00; G01N 25/00
USPC ................ 374/5, 57, 137, 4, 147, 148, 100; 702/35, 40
See application file for complete search history.

(56) References Cited

U.S. PATENT DOCUMENTS

| | | |
|---|---|---|
| 1,906,636 A | 5/1933 | Schlecker |
| 4,308,746 A | 1/1982 | Covington |
| 4,336,708 A | 6/1982 | Hobgood et al. |
| 4,529,974 A | 7/1985 | Tanaka et al. |
| 5,228,329 A | 7/1993 | Dennison |
| 5,416,724 A * | 5/1995 | Savic ..................... G01M 3/24 702/54 |
| 5,637,789 A | 6/1997 | Lawson |
| 5,675,506 A * | 10/1997 | Savic ....................... F17D 5/06 73/592 |

(Continued)

FOREIGN PATENT DOCUMENTS

| | | | | |
|---|---|---|---|---|
| CN | 1301339 A * | 6/2001 | ............... | F17D 5/06 |
| CN | 114018500 A * | 2/2022 | | |

(Continued)

*Primary Examiner* — Gail Kaplan Verbitsky
(74) *Attorney, Agent, or Firm* — Bold IP, PLLC; Houda El-Jarrah

(57) ABSTRACT

A method of detecting and identifying leaking underground pipes for properties having a slab or other type of foundation with a plurality of manifolds utilized to distribute water in the plumbing system of the property. The method includes identifying and detecting a starting fixture to start testing to determine a possible location of an underground leak and performing a series of temperature test checks to determine a number of relevant factors, including, whether an underground leak is before or after a manifold, the feed lines and/or distribution lines of a manifold, and a destination of the distribution lines of the manifold. The series of temperature tests using heating and cooling elements identifies which pipeline contains the underground leak and identifies the point where the pipeline enters a ground (Point A) and the exit point where the pipe exits a ground (Point B) in order to mark these specific pipelines.

21 Claims, 13 Drawing Sheets

(56) References Cited

U.S. PATENT DOCUMENTS

| | | | |
|---|---|---|---|
| 5,883,815 A * | 3/1999 | Drakulich | G01M 3/002 |
| | | | 73/40 |
| 6,147,613 A | 11/2000 | Doumit | |
| 6,547,435 B1 * | 4/2003 | Grosswig | F17D 5/06 |
| | | | 385/12 |
| 6,883,369 B1 | 4/2005 | Myhre | |
| 9,500,554 B2 | 11/2016 | Kulkarni et al. | |
| 10,364,555 B2 | 7/2019 | Trescott | |
| 10,458,825 B2 | 10/2019 | Ozaki et al. | |
| 10,563,382 B1 | 2/2020 | Leverich et al. | |
| 10,704,979 B2 | 7/2020 | Bailey | |
| 2004/0059505 A1 * | 3/2004 | Gallagher | F17D 3/01 |
| | | | 702/1 |
| 2012/0170610 A1 * | 7/2012 | Ramos | G01M 3/28 |
| | | | 374/5 |
| 2013/0197846 A1 * | 8/2013 | Kuroda | G01N 29/30 |
| | | | 702/97 |
| 2014/0067268 A1 * | 3/2014 | Tunheim | G01M 3/38 |
| | | | 702/2 |
| 2015/0192489 A1 * | 7/2015 | Decker | G01M 3/02 |
| | | | 73/40 |
| 2015/0247777 A1 * | 9/2015 | Kondou | G01P 13/0073 |
| | | | 73/49.1 |
| 2015/0355045 A1 * | 12/2015 | Solomon | G01M 3/2807 |
| | | | 702/36 |
| 2018/0058891 A1 | 3/2018 | Easey et al. | |
| 2018/0321385 A1 * | 11/2018 | Embry | G01K 13/02 |
| 2019/0025148 A1 | 1/2019 | Tombak | |
| 2019/0331301 A1 | 10/2019 | Du et al. | |
| 2019/0390990 A1 | 12/2019 | Krywyj et al. | |
| 2021/0088405 A1 * | 3/2021 | Connor | G01N 33/0063 |
| 2021/0318202 A1 * | 10/2021 | Livesay | G06F 21/602 |

FOREIGN PATENT DOCUMENTS

| | | | | |
|---|---|---|---|---|
| CN | 113029443 B | * | 3/2022 | E02D 33/00 |
| CN | 114397403 A | * | 4/2022 | |
| DE | 19509129-02 | * | 7/1998 | G01M 3/002 |
| JP | 4615783 B2 | * | 1/2011 | |
| WO | WO8805530 A1 | * | 7/1988 | |
| WO | WO-2022101628 A1 | * | 5/2022 | |

* cited by examiner

METHOD OF DETECTING AND IDENTIFYING UNDERGROUND LEAKING PIPES

CROSS-REFERENCE TO RELATED APPLICATIONS

This application is a non-provisional application which claims priority to U.S. Provisional Patent Application No. 63/271,202 filed on Oct. 24, 2021, which is incorporated by reference in its entirety.

FIELD OF THE DISCLOSURE

The present invention relates to a system and method for detecting and identifying underground leaking pipes. Specifically, the method and system correctly detect and identify (by a process of deductive reasoning and testing multiple pipelines of multiple manifolds on a property using heating and cooling elements) a specific first manifold comprising a pipeline that enters a slab or foundation (Point A) that connects to the beginning inlet of the underground leaking pipe and a specific second manifold comprising a pipeline that exits a slab or foundation (Point B). This identification helps a property owner determine what type of repairs are needed to correct the issues associated with the leak and helps to minimize expenses associated with such repairs as well as minimizes damage to existing property walls or floors involved in opening up walls to reach the various manifolds that may need testing to determine a location of the underground leaking pipe. In particular, the method and system provided herein may assist a property owner determine exactly which pipe is leaking so that the leaking pipe can be replaced or repaired including providing rerouting of pipes overhead in the property.

BACKGROUND

It is a little-known fact that plumbers are not always able to correctly identify which pipe in a home or other commercial property is leaking. This is especially true for leaks that may be occurring underground. The term "underground" as used herein refers to a leak that is occurring in a pipe located beneath a slab or foundation of a property. Understandably, the property owner wants to minimize any digging up and jackhammering of walls or floors in the property in order to find underground leaking pipes. With above ground pipes, it is easier to determine if there is a leak because the plumber or other detector can see water flowing out of a hole or other break in an above ground pipe even if the plumber or other detector has to expose one or more pipes behind walls or other property surfaces. This is not the case with underground leaking pipes.

It is very common for plumbers to frequently hire specialized leak detection companies to find and mark exactly which pipe is leaking for slab leaks and in which manifold. The use of the term "slab" as used herein refers to the concrete or any other type of material foundation of a home or other type of property.

With underground leaking pipes, the leak detecting companies have to identify specific manifolds that may be affected by the leak. Manifolds are a collection of pipes fitted together with distribution and feed lines (with very few specific types of manifolds that only have distribution lines such as a main water inlet manifold) that distribute hot or cold water throughout the house. It is known that the manifolds will always protrude above ground and will be accessible from the walls of a property. The customer may want to minimize damage to their walls and property when the plumber or other specialized individual is looking for an exact source of a leak.

Leak detection companies sometimes employ audio equipment to attempt to listen to "hissing" sounds below the ground to try and locate where a leak may likely be in the underground pipes and may utilize one or more utility locators, also known as pipe and cable locators, that can help the technician detect where pipes are running underground in a home or other property. There may be other clear signs to indicate where a leak may be occurring including flooding in a particular area or warm floors. However, other than that, most leak detection companies are very secretive in their method regarding how they determine where a leak is occurring in a specific pipe. Some leaks are caused by a small hole that may be no bigger than a size of a pin in a pipe, while others may be much bigger holes or cracks in a pipe. In either case, conventional methods offer no simple way to identify which pipe is leaking.

It is noted that there is no official leak detection certification course or process currently. States do not have such a certification process. Rather, people are trained on the job through other professionals. Notably, many mistakes happen in the detection process using conventional methods. Usually, anyone hired to try and identify a leak is most commonly going to try to listen to a leak using audio equipment, however, this practice leads to many errors and can lead to incorrect pipes marked as being the pipe containing the leak. Mistakes frequently occur when someone solely utilizes audio equipment to try and detect a source of a leak or through trial and error, and it is very expensive to correct these mistakes.

Accordingly, there is still an unsolved need for a system and method for accurately identifying and detecting underground leaking pipes that occur beneath or level with the slab or foundation of a property, and to correctly and accurately identify a starting pipeline that enters the slab or foundation of the property and directly connects to the inlet of the underground leaking pipe and to correctly and accurately identify an exiting pipeline that exits the slab or foundation of the property and directly connects to the outlet of the underground leaking pipeline.

SUMMARY

One or more non-limiting embodiments are described for a method for identifying an underground pipe containing a leak at a property, comprising identifying and detecting via process of logically deduction a first manifold having a starting pipeline (referred to herein as Point A) that enters a slab or foundation of the property and is directly connected to a beginning inlet of the underground pipe containing the leak. The method and system further provide for identifying and detecting a second manifold having an exiting pipeline (referred to herein as Point B) that exits a slab or foundation and is directly connected to the underground pipe containing the leak, wherein there is no intermediate manifold between Point A and Point B. This non-limiting method may further comprise ensuring that a main water inlet valve to the property is not shut off and that water is able to flow to the property and that the water is pressurized and ensuring the fixtures are not turned on unless so desired by the tester in order to creating a controlled environment in which individual fixtures on the property are selectively turned on or off as needed to identify which pipes are running to those individual fixtures. A goal is to detect and identify the underground pipe containing the leak, wherein the underground pipe containing the leak connects to one or more manifolds on the property that protrude above a slab or other type of foundation of the property, wherein the underground pipe containing the leak is below a surface or is level with the surface of the slab or other type of foundation of the property.

The method may further include first assessing and determining whether the leak is likely present on a hot side or a cold side, wherein the hot side refers to when the underground pipe containing the leak is a pipe for transporting hot water and wherein the cold side refers to when the underground pipe containing the leak is a pipe for transporting cold water. Further, the method may include identifying a first test manifold, wherein the first test manifold comprises one or more first manifold pipelines to begin testing to identify a location of and detect the underground leaking pipe. It is noted that the first test manifold does not mean the first manifold on the property or that the first test manifold will automatically include Point A.

The method may further include optionally cleaning the one or more first manifold pipe lines in order to remove unwanted elements that may interfere with the accuracy of the temperature testing that will occur on the visible pipelines of the manifolds.

The method may further include performing a time based temperature check on each pipeline in the first test manifold further comprising based on the determination made that the leak is determined to be on the hot side, cooling each pipeline of the first test manifold or based on the determination made that the leak is determined to be on the cold side, heating each pipeline of the first test manifold, and then reading a new temperature of each pipe line in the first test manifold. The user and detector notes if there is not any change in temperature of any one of the one or more first manifold pipe lines, then it is safe to assume that this first test manifold is located after or past the underground pipe containing the leak.

On the other hand, if there is a change in temperature of any one of the one or more first test manifold pipelines, the method includes determining that this first test manifold is located before the underground pipe containing the leak, further comprising, determining if each pipeline of the first test manifold was cooled, determining if each pipeline of the first test manifold appears to be heating up or appears to be staying room temperature or appears to be cold from the cooling, and comparing a rate of change in temperature between the various pipelines of the first test manifold; and if each pipeline of the first test manifold was heated, determining if each pipeline appears to be cooling down or appears to be staying hot from the heating element, and comparing the rate of change in temperature change between the various pipelines of the first test manifold. As further explained below, when there is a temperature change (whether it is a cooling down of a heated pipeline on a cold water manifold or a heating up of a cooled pipeline on a hot water manifold) and the fixture associated with that respective fixture is not turned on at the time of testing, the fact that there is a temperature change indicates that water is flowing through the tested pipeline toward the leak.

The method may further include determining which fixture each distribution pipeline of the first test manifold is going to further comprising, performing a process of elimination test to determine which fixture the distribution pipelines of the first test manifold are going to and locating a second test manifold associated with the identified fixture and repeating the testing process in order to identify whether the second test manifold comprises Point A or Point B. If it cannot conclusively be determined that the second test manifold comprises Point A or Point B, determining where each pipeline of the second test manifold is going by repeating the step listed above to identify a third test manifold and then repeating the above mentioned steps on as many test manifolds as needed to conclusively identify Point A or Point B and narrowing down the test manifolds to the first manifold containing Point A and to the second manifold containing Point B wherein there is no intermediate manifold between Point A and Point B, and then marking Point A and marking Point B, wherein Point A is a distribution line on the first manifold and Point B is a feed line on the second manifold.

Other aspects and advantages of the invention will be apparent from the following description and the appended claims.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

The present disclosure is generally drawn to various embodiments for detecting leaking pipes that are underground, including those leaking pipes that are either beneath a surface of a slab or other type of foundation or that are even/level with the slab or other type of foundation. The method of identifying which pipe is leaking includes heating or cooling the pipe (depending on whether the pipe is for hot or cold water) (hereinafter known as performing a temperature check) and identifying if a temperature change has occurred. If water is flowing through the pipe (i.e., due to a leak), the temperature will change quickly and noticeably and can be detected by various means, including but not limited to, by touch and/or using equipment. The system can also be used to identify which pipe to replace based on a change in temperature of a pipe entering the ground (Point A) from a specific first manifold and a pipe exiting the ground (Point B) from a specific second manifold, whereby the pipelines of the manifolds marked at Point A and Point B connect to the inlet and outlet, respectively, of the specific portion of underground pipe where the leak is located. Advantageously, one or more purposes of the method as described herein in one or more non-limiting embodiments is to find the exact underground pipe with the leak. This determination of where the leak is located will aid in a repair process and decision of a property owner, whether it be a re-route or replace/repair the leaking pipe that is beneath or level with the slab or foundation where the leaking pipe is located. Further, directly marking the starting pipeline that enters the slab or foundation and connects to the underground leaking pipe and marking the exiting pipeline that connects to the underground leaking pipe is necessary to indicate to a plumber or another person or entity exactly which pipes to reroute or repair depending on the preferences of the property owner. Further, advantageously, by using the method as described herein in one or more non-limiting embodiments, one can minimize damage to the property of the property owner needing the repairs by using the detection methods to avoid opening up walls that do not need to be opened. Further details are provided with respect to the Figures. A very important advantage of the method as presented herein is accuracy in detecting the pipe with the leak so that a property owner knows with accuracy which pipe is leaking so that the leaking pipe can be replaced or repaired. Costly mistakes frequently occur when someone only tries to listen to an area in a house or other location having the loudest sound and that assumes that area is the location of the leak. The method described herein may advantageously avoid such mistakes.

Figure 1:
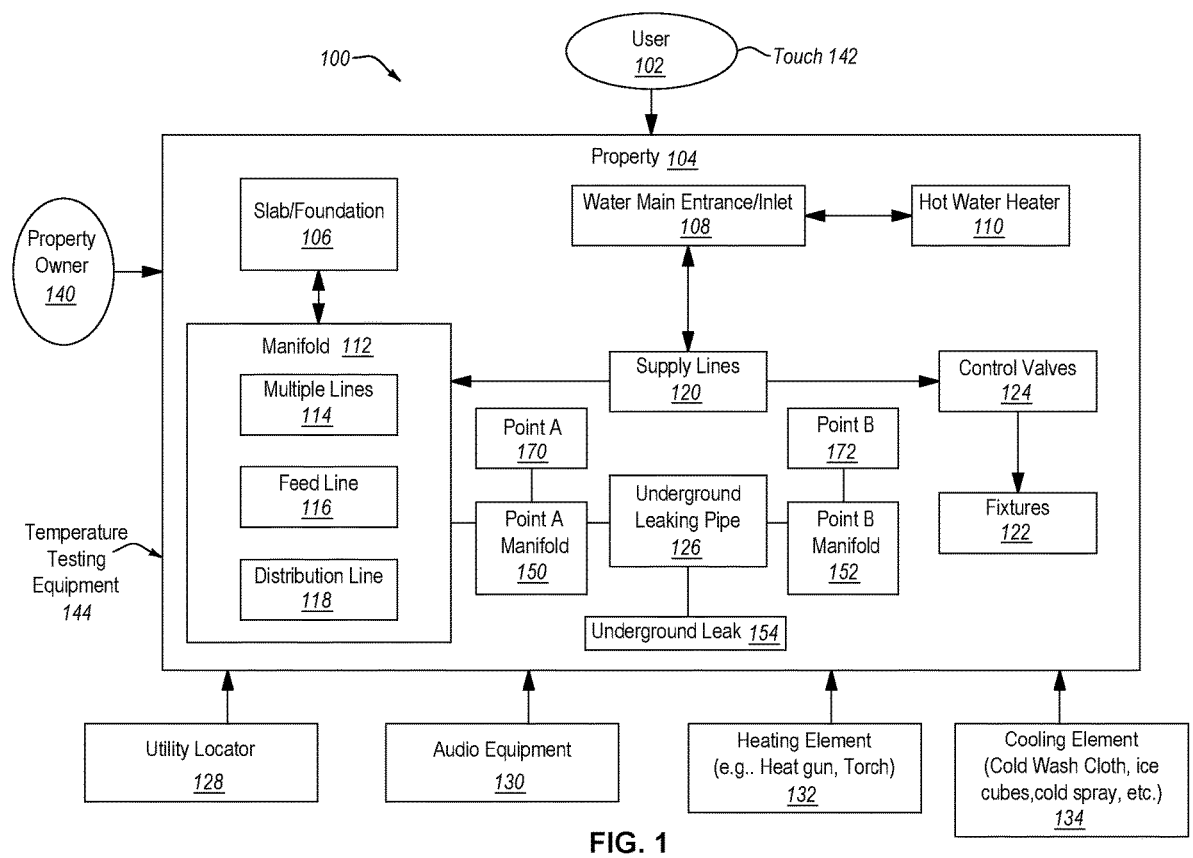
FIG. 1 is a block diagram for a system and method for identifying and detecting leaks that are level or below a slab or other type of foundation for a property.

FIG. 1 shows an exemplary block diagram of one or more components used to detect and identify one or more underground pipes that contain a leak. The method as used herein relates to underground leaks that are even or under a slab/foundation 106. In some instances, the slab or foundation 106, as noted above, may refer to the concrete foundation of a home or other type of property such as property 104. In other instances, the slab or foundation 106 may not be made of concrete and may be made of a variety of other materials. A slab 106 is usually made from concrete especially for home residences, however, slabs 106 do not only have to be made from concrete. Sometimes slabs 106 are made from dirt or brick or a combination of materials. The term "foundation" may interchangeably be used herein for slab 106.

Notably, the method as described herein in one or more non-limiting embodiments may be applied to any type of property 104, regardless of whether the property 104 is a residential or commercial property 104, as long as the property 104 utilizes a slab or foundation 106 and uses manifolds 112, as shown in FIG. 1, to distribute water throughout the property 104 through the manifolds 112 and series of connected pipelines 114. It is noted that the terms "pipelines", "pipes," and "lines" may be interchangeably used throughout the present description.

Figure 6:
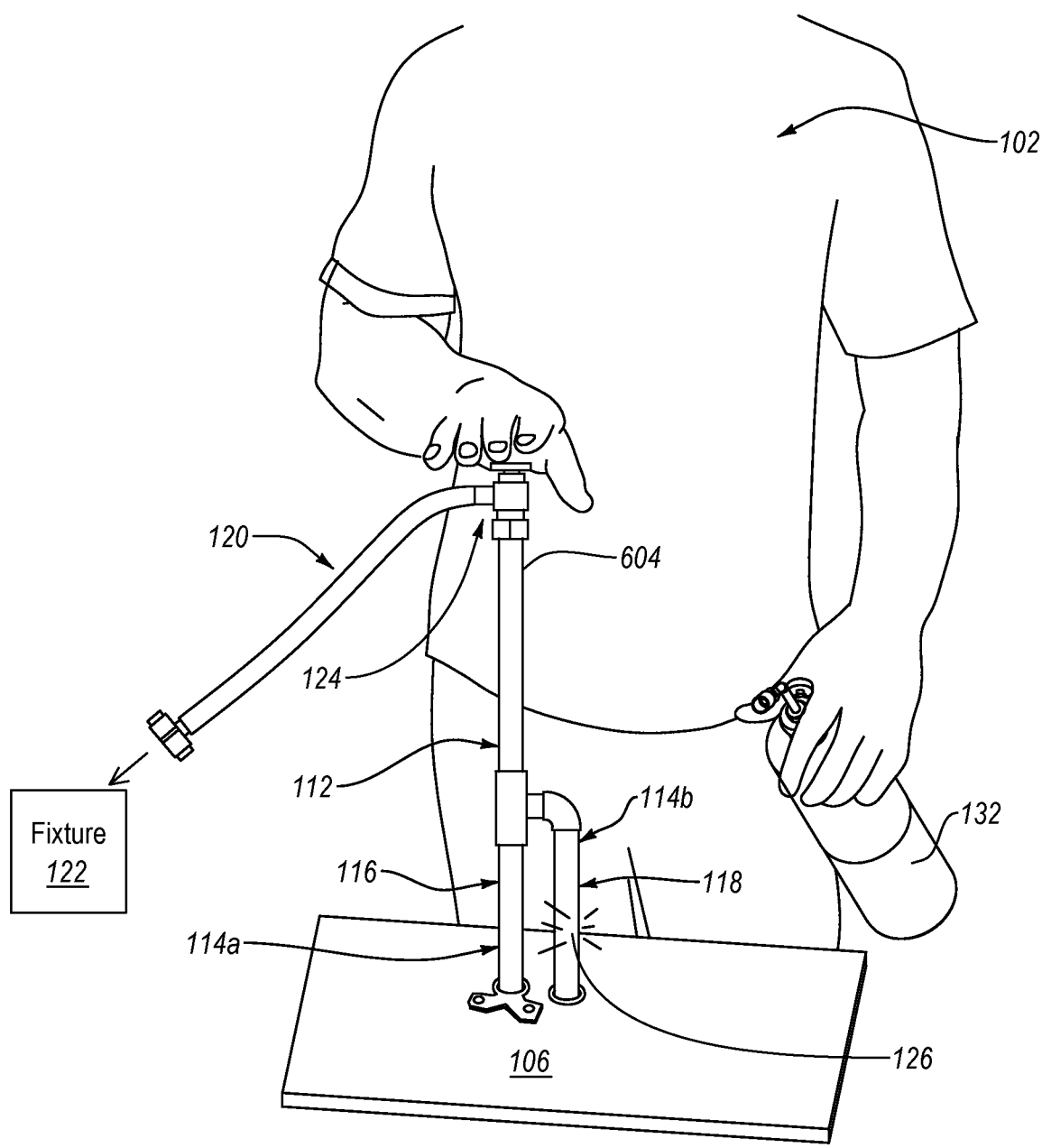
FIG. 6 is a pictorial illustration of an exemplary manifold having multiple pipelines on which a cold-water temperature test is performed to identify a leak.
Figure 7:
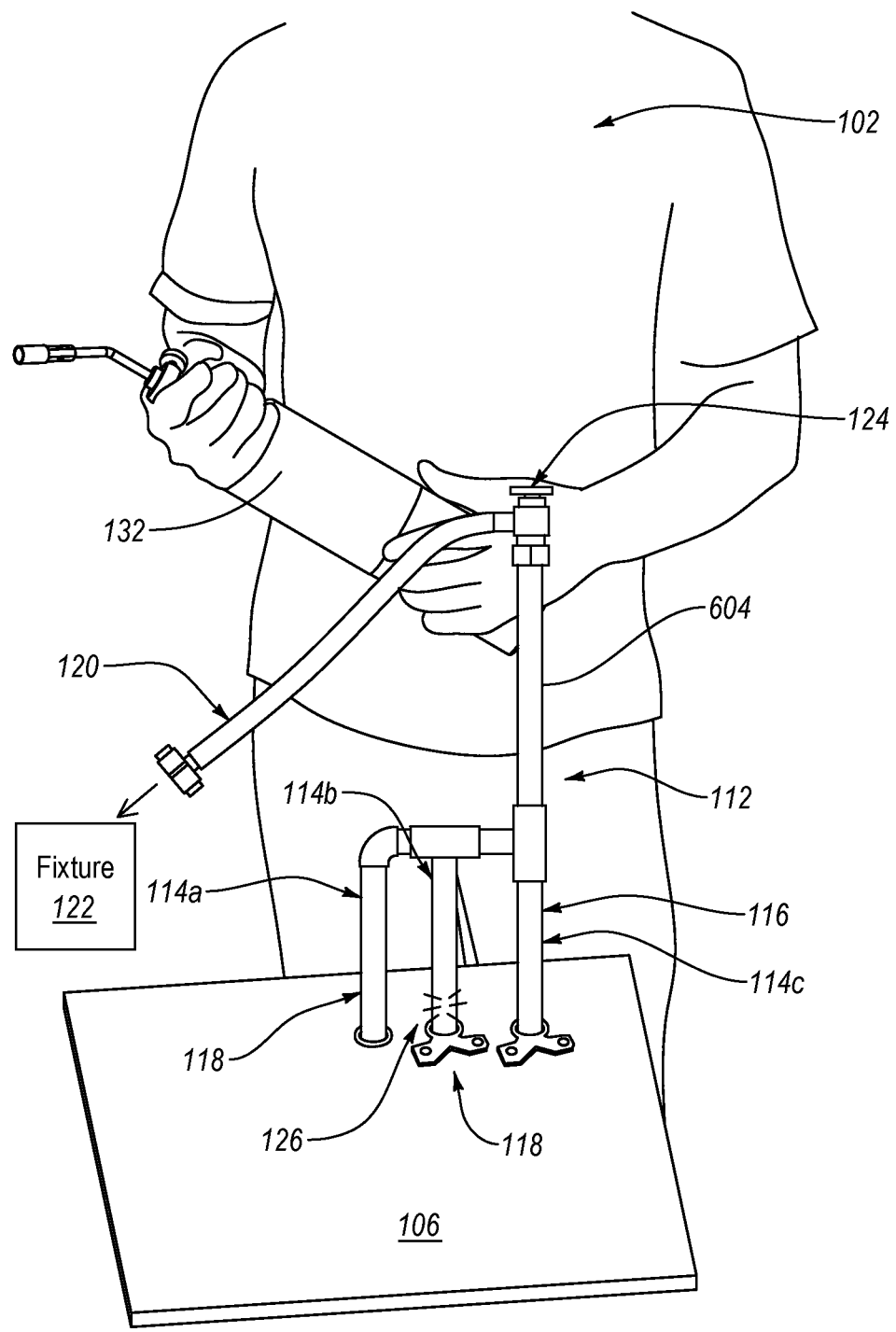
FIG. 7 is a pictorial illustration of an exemplary manifold having multiple pipelines on which a cold-water temperature test is performed to identify a leak.

As noted above manifolds 112 act as distribution centers. FIG. 6 provides an example of a manifold 112 having two pipelines 114, shown as pipelines 114a and 114b that protrude about the foundation 106, while FIG. 7 provides an example of a manifold 112 having three pipelines 114, shown as pipelines 114a-114c that protrude above the foundation 106 and that distribute water throughout the property 104 to specific fixtures 122. Notably, manifolds 112 connect to the pipes 114 that run underground beneath the slab or foundation 106. The term "underground" as used herein refers to any pipes running beneath the topical surface of the slab 106 or that are even or level with a slab 106, while the term "overground" or "aboveground" refers to anything above topical surface of the slab or foundation 106. Accordingly, as further discussed below, a client or customer of user 102 may want to reroute a new pipe or set of pipes to run overground meaning to run a new pipe that runs above the slab or foundation 106 rather than repairing or replacing an underground leaking pipe 126 running under or level with the slab or foundation 106 in some cases. In order for the reroute to be correct, a specific distribution line 118 of the Point A manifold 150 and a specific feed line 116 of the Point B manifold 152 have to be marked so that the installers of the new set of pipes associated with the reroute can connect the new set of pipes to Point A 170 and to Point B 172 for the property 104 to have continuity of water flow and for water to properly flow to the fixtures 122 of the property 104. In other cases, the property owner 140 may prefer to repair all or a portion of the underground leaking pipe 126, but this still requires knowing Point A 170 and Point B 172 to minimize damage to the property owner's 140 floors and foundation 104. Point A 170 as used herein may mean a distribution pipeline 118 on the Point A manifold 150 that enters the slab/foundation 106 to connect to the underground leaking pipe 126 and is located before the leak 154 in the underground leaking pipe 126. Point B 172 as used herein may mean the feedline 116 of the Point B manifold 152 whereby the feedline 116 of the Point B manifold 152 connects to the exit of the same feedline pipeline 116 containing the underground leak 154. The underground leak 154 is contained within a single pipeline that is made up of a single pipeline that has an underground portion that is shown in FIG. 1 as the underground leaking pipe 126. Connected to the underground leaking pipe 126, is the Point A distribution line 118 that enters into the slab/foundation 106 from the Point A manifold 150 and connects to the entrance of the underground leaking pipe 126. Also connected to the exit of the underground leaking pipe 126 is the Point B feedline 116 included in the Point B manifold 152. The one or more non-limiting embodiments for identifying the underground leaking pipe 126 as described herein is focused on identifying not just that there is an underground leak 154, but specifically, on identifying and marking Point A 170 (the distribution line 118 on the Point A manifold 150 that connects to the inlet of the underground leaking pipe 126) and identifying and marking Point B (the feedline 116 on the Point B manifold 152 that connects to the outlet of the underground leaking pipe 126 containing the underground leak 154). A feedline 116 is a pipeline 114 of a manifold 112 in which water flows up and feeds a fixture 122 on the property 104. A distribution line 118 is a pipeline 114 of a manifold 112 in which water flows down.

The user 102, in one or more non-limiting embodiments, may be a specialized technician and/or tester with either extensive knowledge or training in plumbing and leak detection. The user 102 may be separate from the property owner 140, as shown in FIG. 1, in one or more non-limiting embodiments. In other embodiments, the user 102 and the property owner 140 may be the same person if the property owner 140 uses the enclosed method to detect the underground leaking pipe 126 on the property 104. As noted above, the method described herein is not publicly known or understood or utilized by existing plumbers or specialized leak detection companies. Rather, plumbers currently usually have to hire a specialized leak detection company with specialized knowledge in locating where the leak is underground. Such leak detecting companies frequently have problems in accurately identifying where the leak is located. Even then, such leak detection companies do not employ the method as described herein in one or more non-limiting embodiments. What most companies do is attempt to generally locate where the leak may be occurring (e.g., using audio equipment) and mark that location so that the floor or other surface can be jackhammered and that portion of the "leaking" pipe is then replaced. However, this is a temporary solution as typically repair companies are hired to only repair a portion of a leaking pipe rather than change an entire set or series of connected pipes, and it is quite common for leaks to occur again very quickly.

The method as presented herein allows the user to identify with accuracy the entrance and exit of a pipe containing a leak in the ground and allows the repair company to reroute pipes overhead connecting the entrance and the exit of the pipe containing the leak, which is a more long-term, permanent solution than merely replacing a portion of a pipe underground.

Figure 8A:
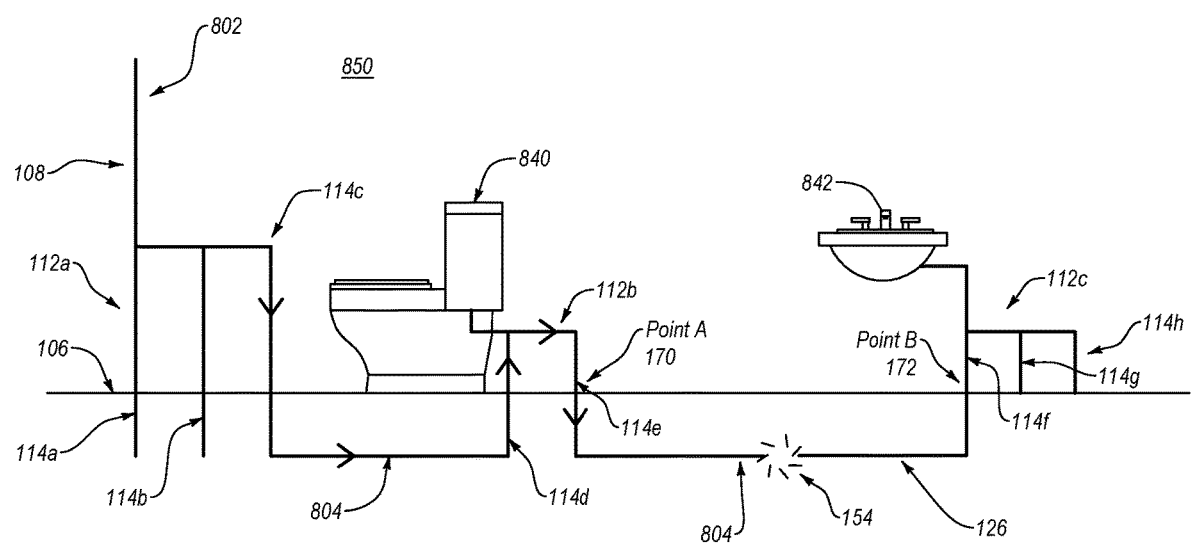
FIG. 8A is another exemplary pictorial illustration of a method for testing and identifying a starting point and ending point for detecting a leak using a cold-water temperature test.
Figure 9:
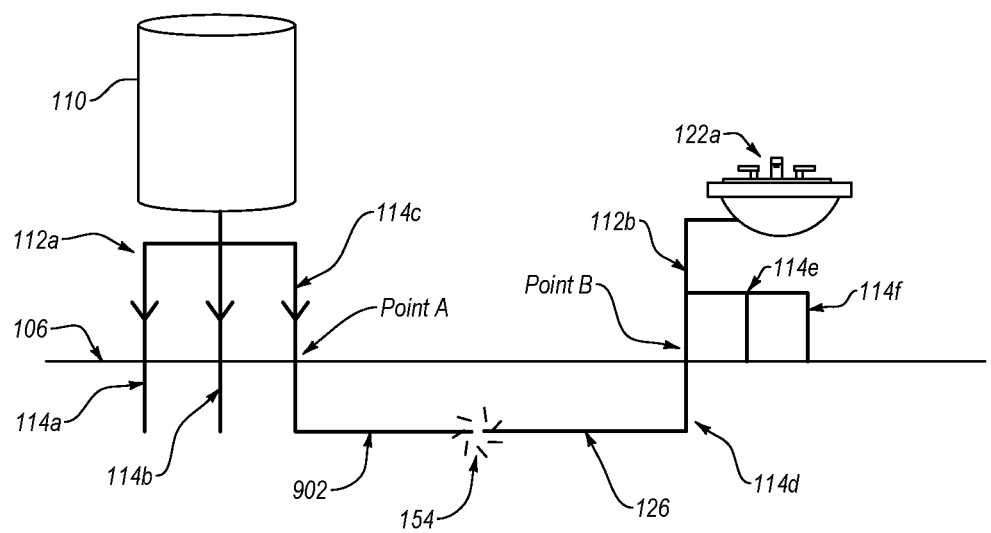
FIG. 9 is another exemplary pictorial illustration of a method for testing and identifying a starting point and ending point for detecting a leak using a hot water temperature test.

As noted above, a repair may include either replacing a small portion of the underground leaking pipe 126 or replacing the entire underground leaking pipe 126 under the slab or foundation 106. Alternatively, many property owners 140 may prefer a reroute in which a new set of pipes is installed overground (i.e., above the slab or foundation 106). It is very important that with a reroute that the plumber or other party responsible for the reroute have a very clear and accurate understanding of the location of the Point A manifold 150, as shown in FIG. 1, which connects to the inlet of the underground leaking pipe 126 and specifically includes a specific distribution pipeline 118 in this Point A manifold 150 that enters the slab/foundation 106 to connect to the entrance of the underground leaking pipe 126. An example of Point A 170 is shown in FIG. 8A and FIG. 9. Further, if the plumber or other party is performing a reroute the plumber or other party has to also have a very clear and accurate understanding of the location of the Point B manifold 152, as shown in FIG. 1, and the specific feedline 116 on the Point B manifold 152 that connects to the outlet of the underground leaking pipeline 126. An example of Point B 172 is also shown in FIG. 8A and FIG. 9.

As noted above, and as shown in FIGS. 6-9, manifolds 112 typically have one or more pipelines 114. It is common for most manifolds 112 on a property to comprise at least two pipelines that feed and/or distribute water from the manifold 112 to another location such as from the main water entrance/inlet 108, from the hot water heater 110, or to a fixture 122. Manifolds 112 can have one, two, three, or more pipelines 114. In the example in FIG. 6, the manifold 112 in FIG. 6 has two pipelines 114a and 114b. One of the pipelines 114 transports water through the riser 604 shown in FIG. 6 to the fixture 122 through the control valve 124 and supply line 120 shown in FIG. 6 to the fixture 122 coupled to the manifold 112 shown in FIG. 6. In some cases, manifolds 112 have more than two pipelines 114 that distribute water from the manifold 112. As shown in the example in FIG. 7, the manifold 112 includes three pipelines 114a-114c. In some cases, manifolds 112 may include up to four or five or a greater number of pipelines without limitation. The pipelines 114 can connect to fixtures 122 and/or enter or exit from the slab or foundation 106 and carry water where needed on the property 104.

Manifolds 112, as shown in examples in FIGS. 6-7, are usually made of metal pipes distributed above ground and arranged in a manner where one or more pipelines 114 come up out of the slab or foundation 106 and feed or direct flowing water from the main water inlet 104 and/or hot water heater 110 to one or more fixtures 122 on the property 104. The pipelines 114 of the manifolds 112 connect to the underground pipes beneath the slab or foundation 106, including connecting to an underground leaking pipe 126 and to other manifolds 112. Notably, manifolds 112 may be distributed all throughout the property 104 and not just at the main water inlet 104 or hot water heater 110 and may normally be found throughout the property 104 at water fixtures 122.

A fixture 122 as used herein refers to units in a property 104 that require water to be distributed to the fixture 122 to function or operate. Common examples of fixtures 122 include hot water heaters, washing machines, dish washers, sinks, toilets, showers, and hose bibs, which can all be selectively turned on and/or off in order to provide hot or cold water to the user. It is typically true that manifolds 112 are located next to or near the fixtures 122 that the manifolds 112 connect to and provide water to. Normally, manifolds 112 are connected to fixtures 122 on the property 104. The manifolds 112 usually always have water flowing at least up one pipeline 114 and down another pipeline 114. In a majority of cases, water flows up one pipeline 114 of a manifold 112, which is known as the feedline 116, and down any other pipelines 114, which are known as distribution lines 118.

However, it is important to note there are at least three locations where the water will flow down (and not up) all the pipelines 114 of the manifolds 112, including the manifold 112 for the water main entrance 108, the hot water manifold 112 for the hot water heater 110, and possibly a soft water manifold 112 if the property 104 includes a water softener. For those three specific types of manifolds 112, the water does not flow up any of the pipelines 114, but rather only flows down the pipelines 114 in order to access underground pipes 114 beneath the slab 106 that take the water from the water main entrance 108, the hot water heater 110, and the soft water manifold 112 for the water softener to other locations in the property 104, and in particular, to other fixtures 122 in the property 104. It is noted that a hot water heater 110 can also be an example of a fixture 122. Further, it is noted that some properties 104 have more than one hot water heater 110. It is noted that a water softener is also an example of a fixture 122. Further, it is noted that the hard water manifold 112 of the softener system will include a feed line 116 distributing hard water to the softener system and possibly distribution lines 118, but the soft water manifold 112 of the softener system only has distribution lines 118 and water is only flowing down in order to be distributed elsewhere.

Manifolds 112 are usually positioned behind walls and/or excess cavities of the property 104 and near the fixtures that the manifolds 112 feed water to. To access them, the user 102 has to cut portion of a wall surface of the property 104 to access a specific manifold 112. In some cases, the user 102 gets lucky and the manifold 112 may be behind an access panel or an HVAC vent whereby the user 102 can unscrew or remove the vent to access such a manifold 112. It is more common though that the user 102 has to cut into the walls of the property 104 when the user 102 is attempting to detect and correctly and accurately identify an underground leaking pipe 126 that contains a leak 154 on the property 104. This is one of the reasons why the method as described herein, according to one or more non-limiting embodiments, is highly desirable because this method is unknown to the public, yet, it greatly assists the user 102 to relatively quickly identify the source of the underground leaking pipe 126 and reduces the amount of damage and repair required afterwards to the walls of a property 104 (and/or floor surfaces) and minimizes the cost to the property owner 140.

As noted above, the manifold 112 has multiple pipelines 114. For most manifolds 112, at least one pipeline 114 on a manifold 112 may be referred to as a feedline 116 that feeds/directs water into the manifold 112 from another source. The remaining pipelines 114 on the manifold 112 may be referred to as distribution lines 118 that distribute the water from the feed line 116 to either a fixture 122 and/or another location, such as to another manifold 112 through one or more underground pipes 114.

It is a known principle in plumbing that larger pipes 114 feed smaller pipes 114. Accordingly, if there is a pipe 114 on a manifold 112 that has a thicker diameter and is larger in its diameter than all the other pipelines 114 of the same manifold 112, it is safe to assume that the thicker or larger pipe 114 is a feed line 116 and is feeding water to a fixture 122. Further, it is safe to assume the water is flowing up that feedline 116 and that the other pipelines are distribution lines 118 in which water is flowing down to take the flowing water through underground pipes 114 to other manifolds 112 and other fixtures 122 in the property 104. It is noted that in some cases there are manifolds 112 that may have multiple (e.g., at least two) larger sized diameter pipelines 114 and then one or more smaller diameter pipelines 114. In such a case, the user 102 cannot safely assume which is the feedline 116 because there is not just one larger size diameter pipe but rather there are multiple larger sized pipes. In such a case, the user 102 has to perform a time based temperature check, as further discussed below, and selectively turn on the associated fixture 122 with that particular manifold 112 to determine with accuracy which larger size pipe is the feed line 116 and which are the distribution lines 114 in order to know whether water is flowing up or down a particular pipeline 114 of a particular manifold 112. It is noted that if there are multiple larger sized diameter pipelines 114 on the manifold 112 and only one smaller sized pipeline 114, then it can be safely assumed that the smaller sized pipeline 114 is a distribution line 116, which may help speed up the temperature testing process further discussed below.

Reiterating what was mentioned before, there are at least three types of manifolds 112 that do not have any feed lines 116 (meaning water is flowing up this particular type of pipeline 114) and only have distribution lines 118 (meaning water is flowing down these particular pipelines 114). The manifold 112 dedicated to the cold water main entrance/inlet 108 only has water flowing down each line 114 in that cold main water manifold 112 and will not have any feedlines 116. The cold water main entrance/inlet 108 manifold 112 will only have distribution lines 118 in which the water flows down towards fixtures 122 on the property 104. Similarly, the manifold 112 dedicated to the hot water heater 110 also only has water flowing down each line 114 of the hot water heater manifold 112, and will not have any feedlines 116. The manifold(s) 112 for the hot water heater (s) 110 located on the property 104 will only have distribution lines 118 in which the hot water flows down to other fixtures 122.

Another unique exception is if there is a water softener on the property 104, then water will flow down each line 114 of the manifolds 112 dedicated to the water softener. If there is a water softener and a water softener loop, then there is a manifold 112 having a pipeline 114 for hard cold water and soft cold water. The pipelines 114 for the cold soft water will all have water flowing down and will be distribution lines 118.

Supply lines 120, as shown in FIG. 1, FIG. 6, and FIG. 7, refer to the often-flexible tubes and cables that run from the pipelines 114 of the manifolds 112 to a specific fixture 122. Each supply line 120 may have one or more control valves 124 attached to a first end of the supply line 120 that can be used to turn on and off water for the fixture 122 and control water flow to a specific fixture 122 at any time. For example, an angle stop valve is an example of a control valve 124 often used in household plumbing and is often found located against a wall near a fixture 122 (e.g., a toilet or sinks).

As shown in FIG. 1, every property 104 typically includes a cold water main entrance/inlet 108 with pressurized water being directed into the property 104 from the city or other location where the property owner 140 lives. Further, every property 104 usually includes at least one hot water heater 110. The hot water heater 110 has a pipe that feeds either directly/indirectly through a series of connected pipes from the cold water main entrance 108 to the hot water heater 110 carrying cold water. Further, there is at least one pipe that leaves the hot water heater 110 intended to carry hot water to the property 104 through the manifold 112 dedicated to the hot water heater 110. The hot water heater 110 is the only or main source of hot water on a property 104 but it is noted there may be more than one hot water heaters 110, especially on larger properties 140.

Further, manifolds 112 only have hot or cold water running through each manifold 112. Accordingly, there will be a manifold 112 with only cold water for a certain fixture 122 and another manifold 112 with only hot water for a certain fixture 122. The hot and cold pipes cannot be mixed for a manifold 112 since then the temperatures would be affected. It is noted that if there is a recirculating pump installed then hot and cold water may be mixed, but this is a unique exception. In general, the hot and cold pipes are not mixed on manifolds 112. Many fixtures 122 have both a hot manifold 112 and a cold manifold 112, such as, for example, showers and sinks a and/or washing machines which are examples of fixtures 122 that use both hot and/or cold water. In some cases, if there is a water softener present on the property 104, there may be three different types of manifolds 112 which are 1) a manifold 112 containing and dedicated to transporting hard cold water 2) a manifold 112 containing and dedicated to transporting soft cold water and 3) a manifold 112 containing and dedicated to transporting soft hot water.

In some cases, cold water can flow through a manifold 112 intended for hot water. This can happen if the hot water heater 110 has ran out of hot water or if the inlet and outlet of the hot water heater 110 are connected to each other and not to the water heater 110 itself in which case the user 102 may have to heat up a hot water manifold 112 during testing as it is cold water that is actually flowing through it.

Notably, the builders of the property 104 do not mark or label the manifolds 112 or the pipelines 114 at the time of their installation on the property 104 with any visual marking that would indicate either the temperature of the water flowing through the pipelines, the direction of water flow, or which fixture 122 the manifolds 112 are distributing water to. In some rare cases, there may be some pipes, in particular, pipes that come out of the slab or other surface that are covered in a thin colored plastic. The builder or other person marking the pipes can use a red plastic if the pipe is a hot pipe or a blue plastic if the pipe marked is a cold pipe, so that the marking process is color coded. However, one cannot rely at all on the accuracy of such color coded sleeves as frequently they are incorrectly marked.

Further, there are no maps showing directions of pipelines and which fixtures are connected via which manifolds. Further, pipelines 114 may crisscross beneath the slab or foundation 106 and be organized to transport water in unexpected directions. For instance, a pipeline 114 on the left of an example manifold 112 may be distributing water to a right side of a property 104 and a pipeline 114 on the right of an example manifold 112 may be distributing water to a left side of a property 104, which is very unexpected. This is one of the reasons why the method, according to one or more non-limiting embodiments, as described herein is so important and useful. Normally, it is very difficult to ascertain which specific pipe 114 is leaking and the entrance and exit from the slab or other foundation 106 for the leaking pipe 126, which needs to be accurately marked for rerouting purposes. As noted above, the manifolds 112 are concealed behind walls of the property 104 and the pipelines 114 are not marked and are not always logically organized and arranged. Further, the underground pipes connecting the pipelines 114 of the manifolds 112 are buried beneath or level with the foundation 106 and are not easily seen in order to ascertain visually where a leak 154 may be present.

The manifolds 112 and pipelines 114 that connect to the identified leak 154, as shown for example in FIGS. 6-9, are shown and everything is clearly marked for the reader to see when referring to the present description. However, that is not the case in the real world. There are many duties and tasks that the user 102 has to accomplish in order to property identify and detect the underground leaking pipe 126 using the one or more non-limiting embodiments of the method described herein without the benefit of knowing in advance where the underground leaking pipe 126 is or where the pipelines 114 on each manifold 112 connect to, or which pipelines 114 are feedlines 116 and which pipelines 114 are distribution lines 118. Normally, to access manifolds 112, the user 102 has to open up walls of the property 104 using tools and cut into the finished walls which the property owner 140 may want to minimize to avoid damage to the walls of the property 104.

In the method described herein, in order to detect accurately the underground leaking pipe 126, as well as to identify Point A 170 and Point B 172, the user 102 has to perform a series of tests involving time-based temperature testing of the pipelines 114 of the manifolds 112 and a narrowing down process to pinpoint Point A 170 and Point B 172. In one or more non-limiting examples of how the method 100 may be implemented, a user 102 may have to 1) detect the presence of a leak and/or validate that there is a leak 154 on the property 104 2) detect whether the leak 154 is in a cold water underground leaking pipe 126 (also referred to herein as the cold side) or in a hot water underground leaking pipe (also referred to herein as the hot side) 3) confirm the leak 154 is before or past a manifold 112 starting with a first test manifold 112 4) in some cases, identify which pipeline 114 in each tested manifold 112 is a feed line 116 and which pipeline 114 is a distribution line 118 5) identify where the distribution lines 118 distribute water to (i.e. which fixtures 122 the distribution lines 118 distribute water to) 6) repeat steps 3-5 until eventually the leak is not past a particular manifold 112 (indicating this manifold 112 may be the Point B manifold 152) 7) identify and mark which pipeline 114 in the Point B manifold 152 is the feed line 116 and 8) ascertain which manifold 112 is the Point A manifold 150 and mark the distribution line 118 of the Point A manifold 150.

Notably, Point A 170 is the pipeline 114 that connects to the same pipe as Point B 172, but Point A 170 leads to the entrance of the underground leaking pipe 126 and Point B leads to the exit of the underground leaking pipe 126. Further, the Point A 172 pipeline is always a distribution line 118 on the Point A manifold 170 that directs water to the inlet of the underground leaking pipe 126, such that water flows through the Point A 172 distribution line 118 and through the underground leaking pipe 126. When the fixture 122 is turned off, some volume of water flows out through the leak 154 and stops at the leak 154. If the fixture 122 is turned on and the fixture is past the leak 154, then water can flow through the outlet of the underground leaking pipe 126 and up the Point B 172 feedline 116 to direct water to another fixture 122 and the Point B manifold 152.

Marking the Point A 170 pipeline and marking the Point B 172 pipeline with any kind of visual marking (but not necessarily written text indicating "Point A" or "Point B") is important for the subsequent reroute or repairs that the plumbing company or another company will undertake to repair the leaking pipe 154 on the property 104. The Point A 170 and Point B 172 pipelines on the Point A manifold 150 and the Point B manifold 152 may be marked with tape or another visible discerning element, such as, but not limited to markers, cloth, or any other visible discerning element. Further, photographs of Point A 170 and Point B 172 pipelines can be taken and marked up digitally to indicate which pipe 114 contains Point A 170 and which pipe 114 contains Point B 172. If desired, the user 102 can mark in writing Point A 170 and Point B 172 also but does not necessarily have to do so.

Figure 2:
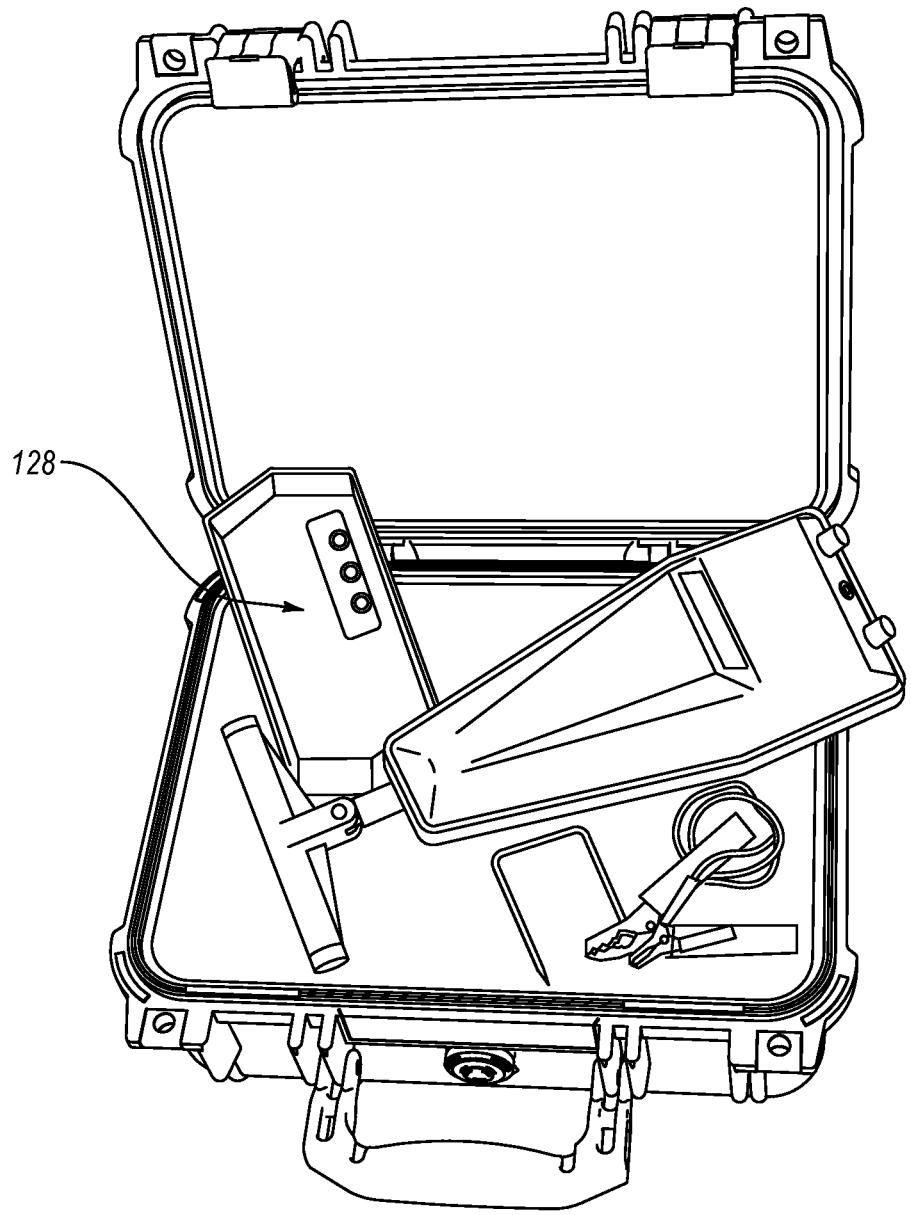
FIG. 2 is a pictorial illustration of an exemplary prior art utility locator.

Accordingly, the system and method 100 as described herein may utilize one or more other components shown in FIG. 1 to correctly detect and identify Point A 170 and Point B 172. In some instances, a user 102 may utilize a utility locator 128, as shown in FIG. 1, as part of the system and method 100. A utility locator 128 is used to locate utilities beneath a slab or foundation 106. Utilities is a broad term that may refer to cables and/or pipes and indicates which fixtures 122 are connected via which pipes (e.g., pipelines 114 on a manifold 112). FIG. 2 shows an example of a utility locator 128. In a non-limiting example, the utility locator 128 may be a GOLDAK type pipe and cable locator/utility locator 128. Accordingly, in a non-limiting embodiment, the user 102 may utilize a utility locator 128 as a shortcut to speed up and simplify tracking and locating specific pipes under a slab or foundation 106 and to determine which fixtures that the pipes 114 run to. Notably, the method 100 as described herein does not absolutely require the use of a utility locator 128. The user 102 can still perform the method, as described herein according to one or more non-limiting embodiments, to correctly detect and identify underground leaking pipes 126 under a slab or foundation 106 and which pipelines 114 of a manifold 112 lead to the leaking pipes 126 without the use of a utility locator 128. It is noted that utility locators 128 do not indicate which pipeline 114 is a feedline 116 or which pipeline 114 is a distribution line 118. The method as described herein still has to be implemented in order to make such determinations. Rather, the utility locator 128 may help identify quickly where various underground pipelines 114 lead to.

Figure 3:
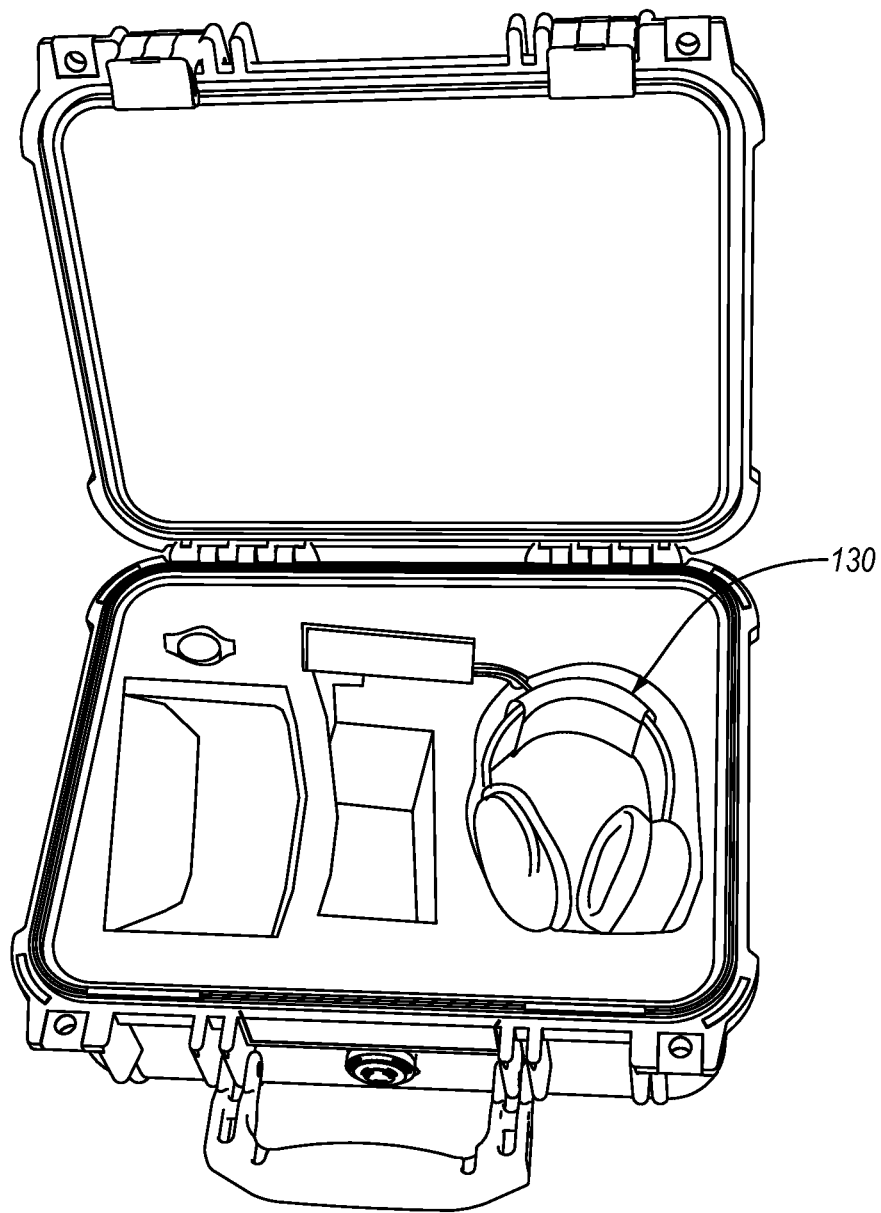
FIG. 3 is a pictorial illustration of an exemplary prior art audio equipment used to locate leaking pipes.

Similarly, the user 102 may optionally utilize audio equipment 130 when detecting and identifying the leaking pipes 126. A non-limiting, prior art example of audio equipment 130 is shown in FIG. 3, which is an example of a SUB-SURFACE INSTRUMENTS water leak detector. Audio equipment 130 may be ultrasonic and may include a microphone and a probe that can be used to listen to the floors of a property 104 or the pipelines 114 of the manifolds 112 to ascertain whether a leak 154 may be present in a particular location on the property 104. The user 102 may use the audio equipment 130 to listen for a prominent hissing sound. The loudest sound usually indicates that the user 102 is closest to the source of the leak 154. Because the manifolds 112 are made of metal pipes (usually copper but some other metals as well), it is useful to utilize audio equipment 130 to listen to the sounds through the floor of the property 104 or listening to the valves 124 directly with a probe from the audio equipment 130 to determine how water is flowing through the metal pipelines 114 and where the underground leaking pipe 126 may be located.

Normally, to listen directly to a manifold 112, the user 102 has to cut open the wall the manifold 112 is behind and expose the manifold 112. The user 102 can use the audio equipment 130 to listen to the angle stops (e.g., control valves 124) at the fixture 122 that each manifold 112 feeds, which may help avoid opening up walls and causing some damage to the walls in the testing process. For example, in FIGS. 6-7, the user 102 can listen to the angle stop 124 as it is exposed on the outside for easy access. Control valves 124 are usually set up such that the hot valve 124 may be on the left side and the cold valve 124 for a fixture 122 is on the right side. So, the user 102 can usually safely assume the control valve 124 on the left is connected to the hot water lines 114 while the control valve 124 on the right is connected to the cold-water pipelines 114 throughout the property 104 and listen to the control valves 124 to determine if a hissing sound is more prominent on the hot side or the cold side based on the respect control valve 124.

Accordingly, the user 102 can also use the probe to listen for the loudest sound by listening to the valves 124 on a particular hot pipeline or cold pipeline 114 that may have the leak 154. In a non-limiting embodiment, the user 102 can listen to every shut off valve 124 on the property 104. In the exemplary, non-limiting case in which the leak 154 proves to be on the hot side, it may be the case that the hot control valves 124 will have some noise while none of the cold valves 124 will have noise that can be audibly discerned by the audio equipment 130, indicating that the leak 154 is on the hot water side. Further, it is likely that the user 102 will hear the noise from the pipes 114 loudest in a particular bathroom of a property 104 (in this exemplary, non-limiting case) and thus can start testing that manifold 112 in that bathroom instead of other areas. Thus, the audio equipment 130 can help speed up the process of identifying where to start testing and which walls to open to expose the hidden manifolds 112 behind the walls in a particular location of the property 104. A user may try to locate the loudest sound or loudest sounding pipeline 114 and begin temperature testing as described below with respect to FIGS. 8A-9.

Further, the user 102 can also use audio equipment 130 to listen to the floors to try and hear where there is the loudest sound (i.e., which is a clue that the leak 154 is located there). If the user 102 listens to the floor of the bathroom, for example, and hears the loudest noise coming from the bathroom, the user 102 can start testing the manifolds 112 in the bathroom versus other areas of the house. This may be a way to identify the first test manifold 112 that the user 102 starts with to determine if the leak 154 and the pipe 126 containing the leak 154 is before or past that first test manifold 112 and to try and identify Point A 170 and Point B 172.

Generally, when using audio equipment 130, it will help to eliminate testing manifolds 112 that do not contain either point A 170 or point B 172. It is safe to assume that the area of the property 104 with the loudest sounds heard through the floors or walls or control valves 124 (whether or not audio equipment 130 is used) must have the leak 154 nearby. Oftentimes, the manifold 112 the user 102 tests after using the audio equipment 130 will likely be the manifold 112 right before the leak 154 and include Point A 170 or be the manifold 112 right after the leak 154 and include point B 172 (but the user 102 will need to verify the accuracy of this statement via more testing and process of elimination as further explained below).

Accordingly, the user 102 may use the ultrasonic audio equipment 130 to listen for the loudest sound (e.g., hissing noise) and start testing the manifold 112 near there. The use of audio equipment 130 may significantly expedite how quickly the detection job is finished. Further, the user 102 can test each manifold 112 one by one and figure out which pipe 114 has the leak 154. The utility locator 128, as noted above and shown in one example in FIG. 2, helps to also expedite the process and reduce cutting into walls of the property 104 because the utility locator 128 helps show where the pipes 114 lead to, which can make the method and system 100 to detect and identify Point A 170 and Point B 172 faster. Also, using the utility locator 128 shows the user 102 exactly where the pipes 114 are in the wall, so the user 102 can open up smaller holes in the wall instead of tearing out large sections. A utility locator 128 can be used to show the user 102 where lines 114 are going and coming from. This can help the user 102 eliminate time temperature testing and the process of elimination test for identifying which fixtures are connected to which distribution lines 118 of which manifolds 112, and track where the pipelines 114 are directed to.

Notably, there are multiple ways to do an audio test (listen to the pipes) including hearing the leak 154 with the user 102's bare ear, using ultrasonic acoustical equipment 130, and even putting a long screwdriver or another long piece of metal on the angle stops and control valves 124.

Notably, the method 100 as described herein may be performed without the use of a utility locator 128 and/or audio equipment 130. There are a number of alternative options the user 102 may turn to in trying to identify the first testing manifold 112. The user 102 may identify all fixtures 122 that use water (e.g., dish washing machines, washing machines, sinks, toilets, and showers) and then look for signs of leaking around each fixture 122. Exemplary signs of leaking may include pooling water or stagnant water around the fixture 122. Other signs of leaking may include warm floors. If there are warm floors in a specific location of a property 104, the user 102 can safely start testing at that location and using method 100 with the safe assumption that the leak 154 is near this location. User 102 may also use thermometers, infrared cameras, and other heat detection equipment including the user 102's bare hands and feet to feel warm spots on the floor. Warm floors are an indication of a slab leak on the hot water side. Warm floors on the property 104 (in the absence of floors that are heated through other intentional means) usually indicate an underground leaking pipe 126 is present and the leak 154 is in a hot water pipe 114 as opposed to a cold water pipe 114. Sometimes there is an audible sound in a bathroom or other location of the house or other type of property 104 that is so loud, it is obvious that location must be this location is where or is at least very near to where the underground leaking pipe 126 is located and the user 102 can safely identify one or more manifolds 112 in that area as a first test manifold 112 and location to start testing to narrow down and find Point A 170 and Point B 172.

Infrared cameras and thermometers are an example of temperature testing equipment 144 that may also be used to find warm spots which when dealing with a leak 154 on the hot side and can give the user 102 a general vicinity of where the leak 154 is located, which can allow the user 102 to start with a manifold 112 nearby, thereby saving time and providing accuracy that the tested manifold 112 is likely close to Point A 170 and Point B 172. Some infrared cameras may even detect colder spots as well, which can aid in locating cold leaks. There are many types of infrared cameras available including large ones and small ones that connect with smartphones. The infrared cameras may be used to tell temperature changes within the pipes 114 of the manifolds 112 without needing to physically touch them.

As an alternative to using utility locators 128, audio equipment 130, and/or temperature testing equipment 144, in a one story house, a user 102 can open up under every fixture 122 to find a manifold 112 if needed and use the detection method 100 as further described below. For two story homes, when the user is upstairs looking for a manifold 112, the user can open up where the drain lines are located or cut out a small section of a wall to expose any hidden manifolds.

Notably, it is not sufficient to utilize the utility locator 128 and the audio equipment 130 to determine with accuracy Point A 170 and Point B 172, which a plumber or other party needs (e.g., insurance companies) to note for repair/reroute purposes. Errors can occur often if the user 102 only relies on using a utility locator 128 and audio equipment 130 as pipe size, and layout play a major factor in audio transmission. Smaller pipes can amplify noise in a misleading way compared to larger pipes and there may be echoes involved. It is noted that which pipe 114 the riser is connected to will also affect the accuracy of the audio as that can cause a great deal of echoes as well. Accordingly, using the utility locator 128 and audio equipment 130 alone is not accurate enough for purposes of determining where the underground leaking pipe 126 is and to determine Point A 170 and Point B 172 with accuracy and exactness.

The method and system 100 as described herein according to one or more non-limiting embodiments and shown in FIGS. 1-10 may require performing time-based temperature checks on the pipelines 114 of the manifolds 112. A time-based temperature check means that if a pipeline 114 of a manifold 112 is dedicated to carrying only cold water, a heating element 132 is used to temporarily heat the cold water pipeline 114 in order for the user 102 to assess if there is a change in temperature and the rate of the temperature change (how quickly each pipeline 114 that is tested changes in comparison to the other). If a pipeline 114 of a manifold 112 is dedicated to carrying only hot water, a cooling element 134 is used to temporarily cool the pipeline 114 in order for the user 102 to assess if there is a change in temperature and the rate of the temperature change.

A basic principle of the method and system 100 as described uniquely herein is that when the user 102 is testing a hot water manifold 112, the user 102 has to cool the pipelines 114 of the hot water manifold 112 using a cooling element 134 and check for a temperature change and rate of temperature change. When the user 102 is testing a cold-water manifold 112, the user 102 heats the pipelines 114 of the manifold 112 using a heating element 132 and checks for a temperature change and rate of temperature change. This is what is meant by "time-based" temperature testing. It is further disclosed below that time-based temperature testing may also be used to help identify whether a particular pipeline 114 is a feedline 116 or a distribution line 118 and which fixtures 122 a distribution line 118 of a particular manifold 112 leads to. Accordingly, time-based temperature testing has multiple purposes in the method and system 100 described herein.

In a non-limiting embodiment, a heating element 132 may be any device or means used to heat the metal pipes 114 of a cold-water manifold 112 that has cold water flowing through the pipes 114 of the cold-water manifold 112. The cold water may flow from the water main entrance/inlet 108 through a series of manifolds 112 or directly to the cold-water manifold 112 to provide cold water through one or more pipelines 114, including at least one feed line 116 and/or distribution line 118 if a feed line 116 is present. As noted above, the manifold 112 for a cold-water main inlet 108, the hot water heater 110, and softener loop (if present) do not include feed lines 116 where water flows in an upward direction of flow. Rather, the water for such manifolds 112 flows only in a downward direction through the distribution lines 118 of the cold-water main inlet 108, the hot water heater 110, and the softener loop (if present).

A heating element 132 as shown in FIG. 1, according to one or more non-limiting embodiments, may be a torch or a heat gun. FIG. 6 and FIG. 7 show a non-limiting pictorial example of a torch being used as a heating element 132 to detect and identify underground leaking pipe 126. It is noted that any other source of heating may also be used such as, but not limited to, hot cloths or hot rags or hot pads.

In a non-limiting embodiment, a cooling element 134, as shown in FIG. 1, may be any device or means used to cool the metal pipes 114 of a manifold 112, in particular, a hot water manifold 112 that has hot water from a hot water heater 110 running through the metal pipes 114 of the hot water manifold 112. A cooling element 134 may be, but is not limited to, cold spray, ice cubes, cold wash cloths, or any means for cooling the metal pipes 114 of the hot water manifold 112 in order to perform a temperature check.

As noted above, the method 100, in some cases, may require assessing and changing the temperature of all the pipelines 114 on a manifold 112 at least once and may be even more than once (two or three times). The method 100 requires that for a cold-water manifold 112, the user 102 utilizes and applies a heating element 132 to heat the pipelines 114 on a manifold 112 in order to feel and/or assess whether the pipelines 114 stay warm such that there is no temperature change after the heating element 132 is applied or whether the pipelines 114 begin to cool down at some rate of change or stay at room temperature.

For a hot water manifold 112, the method 100 requires that a user 102 utilize and apply a cooling element 134 directly on the pipelines 112, in order for the user 102 to begin to feel and/or assess whether the normally hot pipelines 114 cool down or stay at room temperature or if the temperature stays the same (i.e., hot) whereby there is no cooling down of the pipeline 114 after the cooling element 134 is applied.

Thus, the method 100 uses a heating element 132 to heat up cold water pipelines 114 on cold water manifolds 112 and uses a cooling element 134 for hot water pipelines 114 on hot water manifolds 112 as part of the testing process.

It is noted that in some cases, the user 102 may not be required to temperature test multiple manifolds 112 to make a particular assessment. For example, if the user 102 is at a hot manifold with two lines 114, and one line 114 is larger and the other line 114 is smaller, the user 102 can assume the larger pipeline 114 is the feedline 116 and the smaller pipeline 114 is the distribution line 118, and does not have to perform a temperature test to come to this deduction or conclusion.

In another example, if the user 102 feels the pipes 114 on a hot water manifold 112, and the pipelines 114 are all hot, then the user 102 knows the leak 154 is past this point. No time temperature testing is necessary because pipes 114 should not feel hot on their own if no fixture is turned on requiring hot water to flow through the pipes 114. The pipes 114 should feel cooler unless there is an underground leak 154 on the hot water side that is pulling the hot water to the leak 154.

There are many ways to read if there has been a temperature change to the pipelines 114 after heating or cooling them. As shown in FIG. 1, the user 102 may use touch 142 which involves using the user 102's preferably bare hands to feel the outer surfaces of the metal pipelines 114 of the manifolds 112. Another way to read and determine temperature of the pipelines 114 may be to use temperature testing equipment 144. Temperature testing equipment 144 may include, but is not limited to, using thermometers, temperature readers, and/or infrared cameras. Thermometers may include the use of infrared thermometers which may include lasers that can be directed at the pipelines 114 to measure temperature or clamps that can go around the metal pipeline 114 of the manifolds 112. Accordingly, there are a number of ways to test and measure or get a feel for the temperature of a pipeline 114 after it has been heated or cooled down as part of a time based temperature check or temperature test used as part of the method 100.

As noted above, the testing for the method of the pipelines 112 has to be in a controlled environment. Accordingly, the user 102 ensures that the water inlet 108 is not turned off and the inlet to the hot water heater 110 is not turned off also. Further, it is important that no other fixtures 122 are turned on until the user 102 needs to turn on a fixture 122 as part of the testing process. In this controlled testing environment, all that is required is for the pipes 114 to be pressurized. The city provides water directly to the user 102's property 104 via the cold-water main entrance/inlet 108. Thus, for the method 100 to work, the user 102 has to verify that the cold-water main valve is not turned off and that water pipes have pressure or are pressurized. It may be the case, in particular for ranches and farm style homes, that some property owners 104 are on a well type or similar system where they have their own pump and are creating their own pressure.

There should be stagnant water in the pipes of the property 104 and the user 102 can capitalize on this fact when implementing the method 100 as described herein in one or more non-limiting embodiments to attempt to detect and deduce where the underground leak 154 (which is usually not visible to the naked eye and located beneath or level with the slab or foundation 106) is located.

A notable underlying principle of the method and system 100 described herein is that if there is no leak 154, when the fixtures 122 are all off and not actively being used by a property owner 140 and/or user 102, stagnant water exists in the pipelines 114 of the property 104. But in the case where there is a leak 154, water will slowly flow through every pipe 114 of the specific manifolds 112 of the property 104 that directly leads to the leak 154, while every pipe 114 for the manifolds 112 not directly leading to the leak will still have stagnant (non-moving) water. Water may flow through the pipelines 114 at a low flow rate when there is a leak 154. The water in the property 104 will further be pressurized meaning that there are forces (e.g., gravity, altitude, other forces) that exert and act on the water in the pipes of the property 104 to push the water from the water main entrance 108 and/or hot water heater 110 through the pipes and larger plumbing system.

An important principle of the present method 100, as described in one or more non-limiting embodiments, is that a leak 154 in pressurized pipelines 114 (e.g., such as is the case with property 104) will continuously leak until the leak is repaired or fixed. Thus, any leaking pipe 126 will continually pull water towards that leak 154. Notably, water will never stop flowing to the leak 154 until the leak gets fixed and/or the water to the property is shut off. As a result, water from the city ends up flowing into the property 104 slowly only to escape through the leak 154. In some cases, in particular with above ground leaks, the leak 154 can plug itself but this is very, very rare.

If, for example, the underground leaking pipe 126 is on the cold side and a cold-water manifold 112 (as opposed to a hot water manifold 112) needs to be tested, then the leak 154 will constantly be pulling very cold water through the pipelines 114 to exit at the source of the leak 154. The same is conversely true for hot water manifolds 112 and hot water. If the leak 154 is on the hot side and a hot water manifold 112 needs to be tested, then the leak 154 will continuously be pulling hot water through the pipelines 114 to exit at the leak 154 until a repair or reroute occurs.

It is noted that the leaking pipes 126 may have holes the size of a pinhole, which is very small in diameter. However, that is still enough to cause a significant amount of leakage of water. The underground leaking pipe 126 may also have a hole that is bigger than a pin hole and, in some cases, may have very large cracks or holes that cause the pressurized water to pull towards the leak 154 area of the underground leaking pipe 126.

It is noted that in the vast majority of cases there will be one main underground leak 154 that can be identified and detected using method 100 as shown in FIG. 1 and described in the present description with respect to FIGS. 2-10. In some cases, however, there may be multiple underground leaks 154. In such cases, the method 100 may be used over a number of times to detect all the underground leaks 154. Accordingly, the user 102 may identify one of the leaks 154 and have this particular leak 154 repaired or provide a reroute, and then conduct the testing and identification process 100 again until each leak 154 is identified and repaired or a reroute is provided.

As noted above, property owners 140 frequently contact plumbers who reach out to specialized leak detection companies to determine where the underground leaking pipe 126 is specifically located after noticing significantly higher water bills. In other cases, the property owners 140 may also start believing there may be an underground leaking pipe 126 and contact a plumber and/or specialized leak detection company after noticing pooling water and other structural issues in the walls or floors due to leaking water. The property homeowners 140 may also notice warm floors, hissing noises while no water is flowing from a fixture 122, mold and mildew, odd odors, as well as other signs of water damage. Often times, the city will contact the property owner 140 after noticing high consumption of water that there may be a leak 154 present.

In a non-limiting embodiment, the user 102 is called to validate that a leak 154 is occurring within a residence. One way to validate that a leak 154 is occurring is to look at the water meter where the water main line inlet 108 is located to see if the low flow water indicator is moving or turning even when there is no water usage in the house. Next, the user 102 ensures that there is no other water running other than water running to the water main entrance/inlet 108, whereby the fixtures 122 (e.g., washing machines, sinks, etc.) should all be turned off, but the pipes 114 are still pressurized. The user 102 may begin by testing the manifold 112 dedicated to the water main entrance/inlet 108, which includes the first water pipelines 114 to enter the property 104. If there is a leak within the property 104, the leak must be past this first manifold 112 dedicated to the water main entrance/inlet 108. The user 102 may start testing the main line manifold 112 to see what pipe 114 entering the slab or foundation 106 (and there may be several pipelines 114 in a manifold 112) has water flowing through it. As noted above, in a non-limiting embodiment, the user 102 may also use audio equipment 130, utility locators 128, and/or other tools to quickly narrow down where to start testing.

A goal of the method and system 100 as described herein is to locate Point A 170 and Point B 172. When a user 102 begins testing the various manifolds 112 on the property 104 using either a cooling element 134 for the hot water side leaks 154 or a heating element 132 for the cold water side leaks 154, the user 102 is trying to assess whether a tested manifold 112 is before or after the leak 154. Another way to phrase it is to assess whether the leak 154 is before or past the tested manifold 112.

In an example, whereby the leak 154 has been assessed to be on the cold side, a user 102 proceeds to test a first cold water manifold for purposes of determining whether the tested manifold 112 is before or after a leak 154. During this specific temperature test, the fixture 122 associated with the tested manifold 112 is turned off. While the fixture 122 associated with the tested manifold is turned off, the user 102 applies the heating element 132 to all the pipelines 114 of the manifold 112. The user 102 will then read the temperature of the pipelines 114 of the manifold 112 after a small period of waiting time to determine if a temperature change occurred to any of the heated pipelines 114 of the tested manifold 112. If there is a temperature change after a heating element 132 is applied to the pipelines 114 of the tested manifold 112, the pipes 114, which should be hot after the heating element 132 was applied, will begin to become noticeably cold or cooler to the touch or as detected by temperature testing equipment 144 due to the presence of cold water moving or being pulled towards the leak 154.

Conversely, if a hot water manifold 112 is being tested, and a cooling element 134 is applied, then the temperature change means that the tested pipelines 114, which were cooled by the cooling element 134, begin to heat up due to the presence of moving hot water moving towards the leak 154.

The above is an important principle of this method 100 that tries to assess whether a manifold 112 is before or after a leak 154. If after temperature testing the pipelines 114 with either a heating element 132 or a cooling element 134, there is a temperature change and the fixture 122 associated with the tested manifold 112 is turned off, then this is an indication that water is flowing through the pipelines 114 of the tested manifold 112 towards the leak 154. As noted above, because the user 102 knows that in this controlled testing environment, the fixtures 122 are turned off, then there should be no active source causing the water to flow through the pipelines 114 of the tested manifold 112, and yet, the fact that there is a noticeable temperature change after the user 102 either heats the pipelines 114 of a cold-water manifold 112 or cools the pipelines 114 of a hot water manifold 112, which indicates that water is flowing towards the leak 154 anyway and is carrying cold water or hot water towards the leak 154. As noted above, water will flow towards a leak 154 even if fixtures 122 are turned off and this is a principle that the method and system 100 described herein utilizes to detect a location of the leak 154 and location of the underground leaking pipe 126.

The user 102 may wait a minimal amount of time before trying to read and assess if a temperature change has occurred to the pipelines 114 after the heating element 132 or cooling element 134 was applied to the pipelines 114. This minimal amount of time may vary from 5-60 seconds in an exemplary, non-limiting embodiment.

It is very important to determine where Point A 170 and Point B 172 is in the property 104. Point B 172 is the pipeline 114 on the Point B manifold 152 that exits the outlet of the underground leaking pipe 126. Further, Point B 172 is always a feedline 116 on the Point B manifold 152, that feeds water to the Point B manifold 152 and to a fixture 122 associated with the Point B manifold 152.

If a user 102 locates a manifold 112 using the method 100 in FIG. 1 where the temperature checks show the leak 154 is past that point, the user 102 still has to narrow down and find the exact, most proximate manifold 112 having Point A 170, which is the pipeline 114 that connects to the inlet of the underground leaking pipe 126 and that includes the outlet that connects to Point B 172.

It is noted that the method and system 100 as described herein can function whether the user 102 first locates Point A 170 or Point B 172. In some cases, the user 102 may first locate Point B 172, and must work in reverse to find Point A 170. In some cases, the user 102 narrows down the testing to a likely candidate for Point A 170 and then continues the deduction method to determine where Point B 172 is located.

Accordingly, to ensure the accuracy of marking Point A 170, the user 102 has to find Point B 172. To find Point B 172, the user 102 has to know 1) which pipe line 114 in a manifold 112 has water flowing through it is the distribution line 118 2) figure out where that pipe line 114 is going to (e.g., to another manifold 112) 3) repeat steps 1-2 until the user 102 finds a manifold 112 that does not have water flowing through it when the fixtures 122 are turned off 4) and then determine which pipeline 114 of that manifold 112 is a feedline 116 and connects to the exit of the underground leaking pipe 126 and can be marked as Point B 172. Now that the user 102 has found that manifold 112 that contains one pipeline 114 that is Point B 172 (i.e., no water is flowing through that manifold 112 when the fixtures 122 are turned off, and the feed line 116 of that manifold 112 is Point B 172), the user 102 must ensure there are no additional or intervening manifolds between a possible Point A 170 and an identified Point B 172. Further, the user 102 has to narrow down and determine where the feed lines 116 and distribution lines 118 of the relevant manifolds 112 are to deduct with accuracy Point A 170 and Point B 172 and mark them as such. A process of elimination test may be used to do so as further described below with respect to FIG. 8B. The user 102 may then mark Point A 170 and Point B 172 using tape or any other means to mark these pipelines 114 for these manifolds 112 with Point A and Point B.

Figure 4:
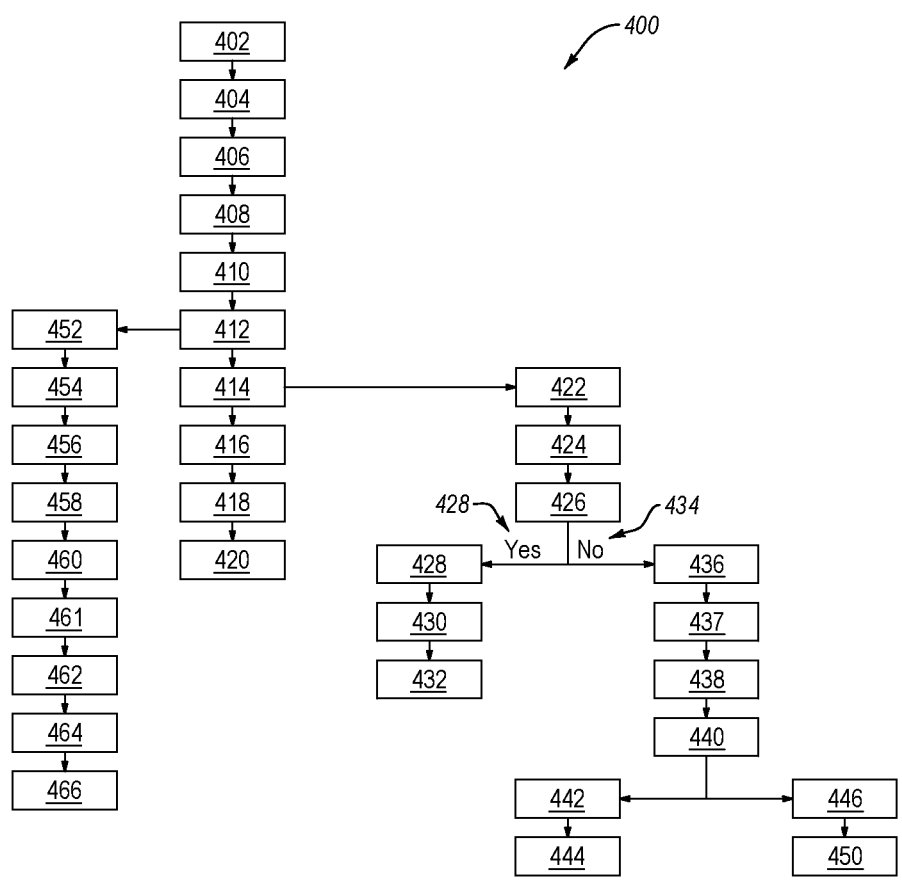
FIG. 4 is an exemplary decision tree and flowchart for a method of testing one or more cold water manifolds in order to detect a starting and ending point of a leak.
Figure 5:
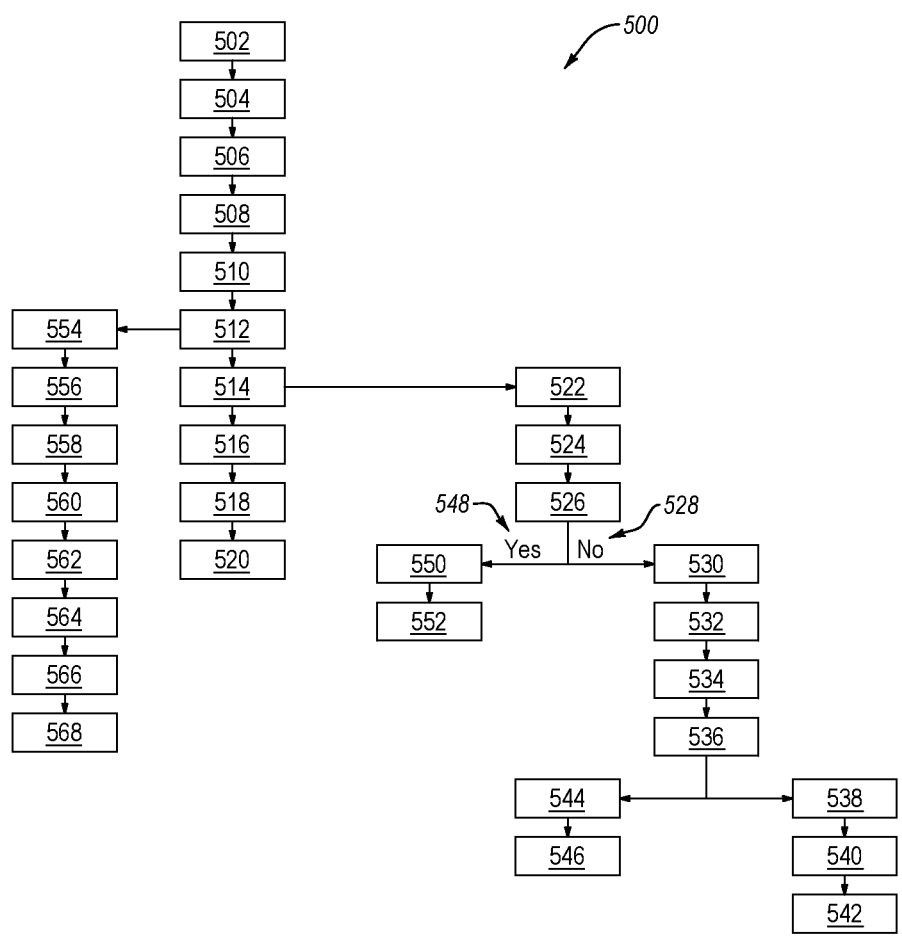
FIG. 5 is an exemplary decision tree and flowchart for a method of testing one or more hot water manifolds in order to detect a starting and ending point of a leak.

Prior to turning to FIG. 4 and FIG. 5, an important part of the method 100 may be when the user 102 determines whether to test a cold-water manifold 112 or a hot water manifold 112. If the user 102 so desires, the user 102 may always start with cold water manifolds 112 located throughout the property 104 to detect and find the underground leaking pipe 126 and then move on to testing hot water manifolds 112 if the leak is not detected at a cold-water manifold 112.

An alternative method may include the user 102 checking the water meter to see if the low flow water indicator on the water meter is spinning or moving. Usually, the water meter has a small indicator known as the low flow indicator that spins when water is moving through the plumbing system. If the user 102 is not using any of the plumbing fixtures 122 in the house while checking the water meter (in a controlled environment) and the low flow water indicator is spinning or otherwise moving, the user 102 can safely assume there is a leak in the house or in the property 104. Next, the user 102 may want to determine if the user 102 should start on the cold side or hot side. The user 102 can shut off the water at the hot water heater 110 and if the low flow indicator stops spinning, then the user 102 can safely assume that the leak is on the hot side and begin the hot water manifold testing as shown in FIG. 5. If the low flow indicator keeps spinning even when the hot water heater 110 is turned off, then the user 102 can usually safely assume that the leak is on the cold side and begin the cold-water manifold testing as shown in FIG. 4. There may be some exceptions including but not limited to where the shut off valve of the hot water heater 110 does not work and the user 102 may need to perform other tests to check where to start (i.e., the hot side or the cold side).

Alternatively, the user 102 can temperature check the main line going into the house which should be cold. The user 102 can torch the main line and it would cool down indicating that the leak 154 must be in the property 104 Then, the user can quickly go to the water heater 110 and check the inlet and outlet of water to the hot water heater 110. The inlet to the hot water heater 110 is usually cold and the outlet or exit of the hot water heater 110 is hot and carries hot water usually. If the user 102 has done the temperature test at the water main inlet 108 and knows that water is coming into the property 104 somewhere, the user 102 can grab the hot water exit pipe or outlet of the hot water heater 110. If the hot water exit pipe or outlet is hot, then the user 102 knows that the leak is on the hot water side and can begin hot water manifold testing as shown in FIG. 4. But if the user 102 grabs the hot water outlet of the hot water heater 110 and the outlet is room temperature and not very hot (as it should be if there is a leak 154 coming from that side) then the user 102 can safely assume that the leak 154 is on the cold side and begin cold water manifold testing as shown in FIG. 4. It is noted that in some cases the hot water outlet of the hot water heater 110 may be cool if the hot water heater runs out of hot water. What can be done along the same lines is if the user 102 grabs the hot water heater outlet and it is cold, the user 102 can assume that the leak is on the cold side unless the hot water heater is out of hot water. The way to test that is to turn on hot water anywhere in the property 104 and go feel the hot water heater outlet again. If the pipe is now very hot, the user 102 has validated that the hot water heater is not out of hot water, and the leak 154 is on the cold side. Inversely, if the user 102 goes back and feels the hot water heater outlet and it is still cold (even though hot water is running inside the property 104 somewhere), then the hot water heater 110 must be out of hot water and/or is not working. Thus, the user 102 can more closely confirm if the leak 154 is on the hot or cold side using such a test on the hot water heater 110.

It is noted that the user 102 has to be aware that in some cases cold water pipes have hot water flowing through them if the customer has a recirculation pump. Further, if the leak 154 is on the hot water side long enough, the hot water heater 110 could run out of hot water and only cold water would be flowing through the pipes 114. In those cases, cold water can flow through what are intended to be hot water pipes 114 and hot water can flow through what are intended to be cold water pipes 114. Either way as the user 102 performs temperature tests throughout the manifolds 112 and uses fixtures 122 selectively the user 102 can determine which pipelines 112 connect to the leaking pipe and have a leak.

It is noted that FIG. 4 and FIG. 5 may still require additional steps. A user 102 may still need to go through a process of elimination test to determine what pipeline 114 (which will be a distribution line 118) is connected to the entrance of the underground leaking pipe 126 and can safely and accurately be marked as Point A 170 and what pipeline 114 (which will be a feed line 116) connects to the exit of the underground leaking pipe 126 and can safely and accurately be marked as Point B 172.

A process of elimination test as used herein means the user 102 has to track and follow where the distribution lines 118 of a manifold 112 lead to in order to know which fixtures 122 are connected to each other. This is a relevant part of the determination that the user 102 has to make with respect to finding Point A 170 and Point B 172 and being sure there are no intervening manifolds 112 between Point A 170 and Point B 172, such that the Point A manifold 150 is the only manifold 112 with a distribution line 118 leading directly to the entrance of the underground leaking pipe 126 and such that the Point B manifold 152 is the only manifold 112 with a feed line 116 leading directly to the exit of the underground leaking pipe 126, with the remainder of the underground leaking pipe 126 containing the leak 154 running underground between the Point A manifold 150 and the Point B manifold 152. Using the process of elimination test, the user 102 may have to narrow the fixtures 122 to a set of fixtures 122 with distribution lines 118 that lead to each other, in order to assess which manifolds 112 and distribution lines 118 are before or after a leak 154.

Figure 8B:
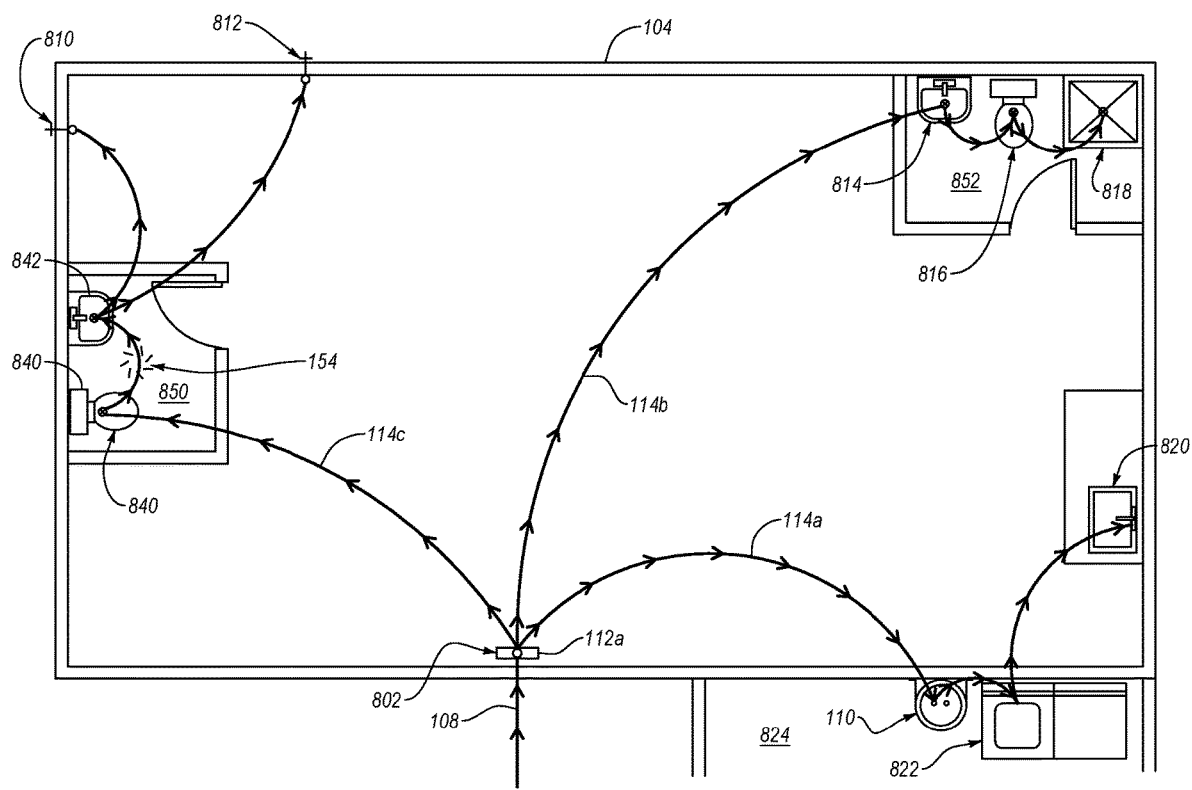
FIG. 8B is another exemplary pictorial illustration for performing a process of elimination test using a series of temperature tests to narrow down to the pipelines of FIG. 8A to identify the starting point and ending point for detecting a leak and the pipe containing the leak using a cold-water temperature test.

Generally speaking, a process of elimination test may include: 1) determining whether the leak is on the a cold side or a hot side 2) identifying a first test manifold 112 and identifying a first fixture 122 associated with that first test manifold 112 3) changing the temperature of the pipelines 114 of the first test manifold 112 (i.e. heating and cooling manifolds as needed based on the determination made in step 1) 4) determining based on the time temperature test, whether the first test manifold is before or after the leak 154 5) determining which pipeline 114 at the manifold for the first fixture 122 is the feed line 116 and which pipe line 114 is the distribution line 118 (e.g. using the time based temperature test or checking for larger sized singular pipelines 114) 6) identifying a second fixture 122 7) performing another time temperature test on the pipelines of the first test manifold 112 to determine if the distribution lines 118 of the first test manifold cools down or heats up at a slower rate than the other as the distribution line 118 from the first test manifold 112, whereby the one that cools down or heats up quickly (i.e. has a temperature change opposite the heating or cooling element that was applied to the pipeline) is the distribution line 118 going to a second fixture 122. The fact that the tested distribution line 118 has a noticeable and/or significant temperature change almost instantaneously when the second fixture 122 is turned on lets the user 102 know that specific distribution line 118 does indeed transport water to that second fixture 122. Conversely, if when the second fixture 122 is on, and the user time temperature tests the pipelines 114 of the first test manifold 112 and no temperature change occurs to the pipe when the second fixture 122 is turned on, then the user 102 knows those distribution lines 118 of the first test manifold do not lead to the second fixture 122. The user 102 has to continue to test the relevant fixtures 112 on the property 104 and their distribution lines 118 in order to narrow down and eliminate the fixtures 122 not leading to the leak 154 and to eliminate intervening fixtures 122 between Point A and Point B. FIG. 8B further goes into detail about a method of narrowing down and identifying which manifolds 112 and which fixtures 122 should be focused on for purposes of identifying the Point A manifold 150 and the Point B manifold 152.

Turning to FIG. 4, FIG. 4 shows an example of a decision tree or flowchart 400 related to testing a cold-water manifold 402. At step 404, the user 102 wants to make sure that there is no other water running at the residence meaning no plumbing fixtures 122 such as toilets and sinks are actively being used and running. Next, while not shown in the decision tree in FIG. 4, the user 102 needs to identify a first testing manifold 112 and has to cut into the wall of the property 104 to access and expose such a first testing manifold 112 (e.g., a cold water manifold 112) and its respective pipelines 114 (which may include two or more pipelines 114). Once the pipelines 114 of a first test manifold 112 are exposed, the method 100 may include cleaning the individual metal pipes of the pipelines 114 at step 406. Cleaning the pipes may be achieved by using a piece of sandpaper or wire paper or a wire brush or a file or an emery cloth in one or more non-limiting embodiments. Any other cleaning element may be used to scrape off any sludge, slime, gunk, concrete, plastic, or any other unwanted type of element located on the pipes. It is important to clean the pipes because, if the user 102 attempts to temperature test or check the pipelines 114 of the first test manifold 112 or any type of manifold 112 and there is a lot of unwanted debris or elements on the pipelines, this may interfere with the accuracy of the test results. Accordingly, it is important to clean the pipes of a manifold 112 as noted in step 406.

At step 408 as shown in FIG. 4, the user may proceed to torch or otherwise heat using heating element 132 each pipe 114 of an identified manifold 112 coming out of the ground as evenly as possible. Accordingly, if the heating element 132 is a hand-held torch (e.g., such as the torch 132 shown in FIG. 6), the user 102 may turn on the torch 132 and allow the hot gas to blow towards the metal pipes of each pipeline 114 of the manifold 112. At step 410, the user 102 proceeds to feel using his or her bare hands the pipes 114 of the first test manifold 112 after torching. If in one scenario, as shown at step 412 in FIG. 4, one or more of the pipes have cooled down and there is a temperature change to the pipelines 114 after the heating, and all the fixtures 122 are turned off, then this is an indication that water is flowing through the pipelines 114 toward a leak 154. The user 102 can assume that this manifold 112 may possibly serve as identifying point A 170, but the user 102 may have to perform further testing to determine conclusively that this manifold 112 is Point A 170. At this point, the user 102 knows that the leak 154 is past this manifold 112. In some cases, the distribution line 118 of this identified manifold 112 might take the user 102 to another manifold 112 where the leak 154 is past and so on and on. As noted above, the user 102 will know with accuracy where Point A 170 is when the user finds a manifold 112 without water flowing through its pipelines 114 after temperature testing the pipelines 114 and then traces back to the manifold 112 proximate or closest to that manifold 112 that does not have water flowing through the pipelines 112 when the fixtures 122 are turned off, and that also has a distribution line 118 that leads towards that manifold 112, at which point the user 102 may conclude that manifold 112 is Point B 172 with accuracy. As stated above, the user 102 has to test until the user 102 is sure that there is no additional manifold 112 or intermediate manifold 122 between Point A 170 and Point B 172 and that Point A 170 is a distribution line 118 and Point B 172 is a feed line 116.

Continuing with the method shown in FIG. 4, at step 414, one or more pipes 114 have quickly cooled down and the rest are hot. At step 416, if one pipe 114 cools down, the user 102 must be at the main cold-water inlet for the residence 140 or at the soft water manifold 112 at the water softener loop if one is present. The leak 154 must therefore be past this point and past this manifold 112. At step 418, the decision process further includes determining that the leak 154 is in the one pipe that cooled down because the cold water is pulled towards the leak which causes the torched pipe to cool down. At step 420, the user 102 may possibly identify that pipeline 114 as point A 170.

In an alternative scenario, at step 422, two pipes have quickly cooled down and the rest are hot. At step 424, if two pipes 114 cooled down, the leak 154 is past this manifold 112 and flowing up one pipe 114 (e.g., the feed line 116) and down the other to get to the leak 154. The user 102 may determine which pipeline 114 is the feed line 116 and which is the distribution line 118, which most likely contains the leak 154. With respect to FIG. 6 and FIG. 7, the present description includes further information for identifying which pipes are the feed lines 116 and which pipes are the distribution lines 118.

Continuing with step 426, the next query is whether the two pipes 114 that got cold are different sizes or not. If yes, at step 428, then the larger diameter pipe 114 is the feedline 116 and the smaller diameter pipe must contain the leak 154 as shown at step 430. At step 432, the smaller diameter may be Point A 170 and the user 102 can safely assume that the leak 154 is past this point. Upon conclusively determining this pipeline 114 is Point A 170, then this pipeline 114 of this identified manifold 112 may be marked so that the user 102 knows this pipeline 114 goes into the slab or foundation 106 and is connected to the leaking pipeline 126 and is before the leak 154.

It is noted that if the manifold 112 has two or more larger sized diameters pipelines 114 and then the rest of the pipelines 114 are smaller in diameter, then the user 102 has to test each of the larger sized diameter pipelines 114 to accurately determine which larger sized diameter pipeline 114 is a feedline 116 and which is the distribution line 118. For example, if a manifold 112 has two larger sized diameter pipelines and one smaller sized diameter pipeline then the user 102 can safely assume that the smaller sized diameter is a distribution line 118, but still has to test to determine which of the larger diameter sized pipelines 114 is the feedline 116 and which of the larger diameter sized pipelines 114 is the distribution line 118. The user 102 can perform this test by turning on the fixture 122 and temperature testing/checking to determine which is the feedline 116. The feedline 116 will be the pipeline 114 that becomes colder quicker than the distribution line 118 when its respective fixture 122 is on and more volume of water is flowing through the feedline 116 cooling it down quicker after the user turns on the fixture 122 and torches or applies the heating element 132 to the pipeline 114 being tested to determine if that particular pipeline 114 is the feed line 116 or not. In the case where the tested manifold 112 is a hot water manifold 112, then the feedline 116 will become hotter quicker than the distribution line 118 as more water volume is flowing through the feedline 116 and heating the feedline 116 up quicker when the fixture 122 is turned on and the cooling element 134 is applied to the pipeline 114 being tested. The user 102 can read and assess the temperature using any number of ways, including touch 142 and/or using temperature testing equipment 144.

Returning to step 426, if the two pipes that got cold are not two different sizes as shown at step 428, then the user 102 must determine which pipe 114 is the feedline 116 and which line 114 is the distribution line 118. Accordingly at step 436, the user 102 must clean the pipes 114 and turn on the cold water at the fixture 122 this manifold 112 feeds (e.g., toilet, shower, sink) at step 437. At step 438, the user 102 torches each pipe 114 coming out of the ground/slab or foundation 106 as evenly as possible. At step 440, the user 102 feels the two pipes 114 immediately after torching in order to discern any noticeable difference in temperature via touch 142 with the user 102's hands or using temperature testing equipment 144. At step 442, if in this example, the pipe 114 never got hot and stayed cool, then it is safe for the user 102 to assume that the pipe is the feedline 116 and not the pipe 114 containing the leak 154 as shown at step 444. At step 446, if the pipe was warm but cooled down, then it is safe to assume the leak 154 is past this point. If the user 102 did full testing and determined where the feedlines 116 and the distribution lines 118 are and has found Point B 172, then the user 102 can safely assume the leak 154 is past these points shown at step 448. Once the user 102 performs a complete process of elimination test, as further described below, then the user 102 may be able to mark this pipe 114 as Point A 170 (at step 450). It is noted that the user may need to compare first the temperature of the pipelines 114 before a fixture 122 is turned on in order to determine how quickly the pipelines heat up or cool down. In some cases, the feedline 116 will be hot at first but then it might cool down or become much colder faster than the distribution line 118 when the fixture 122 is turned on and cold water is being directed through the feedline 116 to the fixture 122.

Returning to step 452 after the user 102 feels the pipes 114 after torching them at step 410, it may be apparent that none of the pipes 114 have quickly cooled down and all the pipes 114 remain hot. After performing a process of elimination test, the user 102 may be able to identify this manifold 112 and a feedline 116 of this manifold 112 as Point B 172. At step 454, the user 102 can deduce that if no pipes 114 cool down, then the leak 154 is before this manifold 112. Before performing further testing, the user 102 may clean the pipes 114 at step 456. At step 458, the user 102 may turn on the cold water at the fixture 122 this manifold 112 feeds (such as the sink, toilet, or shower). At step 460, each pipe 114 may be torched coming out of the ground as evenly as possible. At step 461, the user 102 may feel the pipes 114 after torching. At step 462, one pipe 114 will be cold and this is the line feeding the manifold 112 and thus feeding the fixture 122 that was just turned on. At step 464, in this particular example, the user 102 can safely deduce based on these temperature checks that the feed pipe 116 to the fixture 122 contains the leak 154 and that the leak 154 is before the manifold 112. At step 466, the user 102 identifies this pipeline 114 as being Point B 172 and marks this pipeline 114 as being after the leak 154.

Turning to FIG. 5, FIG. 5 shows an example of a decision tree or flowchart 500 for testing a hot water manifold 112 to detect and identify a leak on the property 104, which may begin at step 502. At step 504, the user 102 must make sure that no other water is running at the residence or other type of property 104. Accordingly, the testing must be held in a controlled environment in which no plumbing fixtures 122 have water actively running through them (unless the user 102 needs to turn a fixture 122 on to perform a time based temperature test).

At step 506, the user 102 may clean the pipes and cool each pipe 114 coming out of the ground/slab or foundation 106 that is part of the first test hot water manifold 112 as evenly as possible at step 508. The user 102 may use a cooling element 134, such as, but not limited to ice cubes, cold cloths, cold spray, or any other type of cooling element to cool the hot water manifold pipelines 114 for testing purposes and to perform a temperature check.

At step 510, the user 102 may feel the pipes 114 after cooling. At step 512, if one or more of the pipes have heated up, then this will possibly be identifying point A and the user 102 may anticipate marking this identified pipeline 114 and manifold 112. Further, testing may be required such that the user 102 detects, as shown at step 514, that one pipe 114 has quickly heated up and the remaining are cold. At step 516, if one pipe 114 heats up, then the user 102 must be at the hot water heater manifold 112 and the leak 154 must be past this point. At step 518, the user 102 may deduct that the leak 154 is in the one pipe 114 that heated up and mark this identified pipeline 114 and manifold 112 as possibly being Point A 170 which is at step 520.

Returning to step 522, in the same scenario, it may be the case that the first test hot manifold 112 has two or more pipes 114. At step 522, if two pipes 114 have quickly heated up and the rest are cold then the user 102 must continue using temperature checks to change the temperature to determine which is the feedline 116, which is the distribution line 118, and where the leaking pipe 126 connects to. At step 524, if two pipes 114 heat up, then the user 102 can safely assume that the leak 154 is past this manifold 112 and flowing up one pipe 114 (i.e., the feedline 116) and down the other to get to the leak 154. Next, the user 102 must determine which is the feedline 116 and which possibly contains the leak 154. At step 526, the user 102 must assess if the two pipes 114 that got hot are different sizes. If the pipes 114 are different sizes and one is larger than the other, at step 548, then the user 102 can safely deduce that the larger diameter pipe 114 is the feed 116 and the smaller diameter pipe 114 is the distribution line 118 that must contain the leak 154 at step 550. The user 102 may mark this identified pipeline 114 (the smaller diameter pipe) as possibly being Point A 170 (with further conclusive testing using a process of elimination test) and note that the leak 154 may be after this pipeline 114 and after this manifold 112.

Returning to step 526, if the two pipes are not two different sizes, then the user 102 cannot safely assume which pipe 114 is the feedline 116 and which pipeline 114 is the distribution line 118, and will have to perform another test to be sure. At step 530, the user 102 may clean the two same diameter sized pipes 114 that heated up to ensure further accuracy. At step 532, the user 102 may turn on the hot water at the fixture 122 that this manifold 112 feeds, which may be a sink, shower, dishwasher, or another type of fixture 122. At step 534, the user 102 may cool each pipe 114 coming out of the slab or foundation 106 and through the manifold 112 as evenly as possible. At step 536, the user 102 may feel the two pipes 114 with his or her hands or skin or another part of the body like the wrist or arms immediately after cooling the pipelines 114 and applying the cooling element 134. At step 544, if one of the pipes 114 that is being tested never gets cold and stays hot, then the user 102 can safely assume that this pipe is the feedline 116 and not the pipe 114 containing the leak 154 (as it never cooled which would indicate a large volume of hot water is flowing through the pipe 114 to escape out the fixture 122 that was turned on keeping the pipe 114 warm at all times as compared to the distribution line 118 which is only carrying a small amount of water towards the leak 154). It is noted that the user may need to compare first the temperature of the pipelines 114 before a fixture 122 is turned on in order to determine how quickly the pipelines heat up or cool down. In some cases, the feedline 116 will heat up and become hotter faster than the distribution line 118 which will take longer to become hot when hot water flows through the feedline 116 to the fixture 122.

If, as shown at step 538, one of the pipes was cool but does warm up then the user 102 can safely assume that this pipe possibly contains the leak 540 and mark this pipe 114 as being Point A 170 as shown at step 542. This Point A 170 may indicate to the user 102 that the leak 154 is after this pipeline 114 and this manifold 112. As noted above, the user 102 may mark the pipelines 114 with any marking device including colored tape, regular tape, markers, or any distinctive marking element (e.g., tying a rag or wash cloth around the pipeline 114). But, the user 102 does not have to use actual written text that states "Point A". Rather, any type of visually discernible indicator/marking is acceptable.

The user 102 must next identify Point B 172 or the connected pipeline 114 that is after the marked point A so that the plumber or other party may know how to perform a reroute and where to connect a new pipe above ground if that is what the property homeowner 140 prefers to do. At step 554, if the user 102 performs steps 504-510 and feels the tested pipes 114 after cooling and none of the pipes 114 have quickly heated up and all the pipes 114 remain cold then this manifold 112 will be identifying Point B 172. At step 556, if none of the pipes 114 heat up, then the leak 154 is before the manifold 112. At step 558, the user 102 may clean the pipes 114 to ensure further accuracy of the testing and continue with step 560, whereby the user 102 turns on the hot water at the fixture 122 this manifold 112 feeds (e.g., such as a sink or shower) At steps 565 and 566, if one of the pipes 114 becomes hot then the user 102 can safely assume that this is the pipeline 114 feeding the fixture 122 that was just turned on and the feed pipe 116 contains the leak as shown at step 566. Accordingly, the user 102 can safely assume that the leak 154 is before the manifold 112. The user 102 may need to perform a process of elimination test to conclusively mark this identified feedline 116 as Point B 172. Accordingly, FIGS. 4-5 provide exemplary information about how user 102 may temperature check the manifolds 112 on a cold-water manifold 112 or a hot water manifold 112 and determine which pipeline 114 of each respective manifold 112 is a feedline 116 and which pipeline 114 is a distribution line 118.

Turning to FIGS. 6-7, FIGS. 6-7 provide some pictorial illustrations of further examples of how user 102 may perform the testing similar to what was described above and shown in FIGS. 4-5. Notably, manifolds 112 are not usually exposed and out in the open as shown in FIGS. 6-7. FIGS. 6-7 simulate and recreate a controlled testing environment. But, in reality, the user 102 has to cut open the walls using tools for such a project as known in the art where the manifolds 112 shown in FIGS. 6-7 are located and access the manifolds 112 in this manner.

FIG. 6 shows the user 102 simulating a test to detect and identify an underground leaking pipe 126. Importantly, the marking of 126 in FIG. 6 is only to indicate that the identified pipeline 118 leads to the underground leaking pipe 126. Notably, the leak 154 is not actually at the spot indicated in FIG. 6 which is above ground, but rather will be underground and not visible to the eye.

Notably, the user 102 does not know exactly beforehand where the underground leaking pipe 126 is. If the user 102 has utilized audio equipment 130 to listen and determined there is a large sound associated with the identified manifold 112 shown in FIG. 6 and further identifies that the leak 154 in the pipe running underground is on the cold side or the hot side, this may provide some indication that the leak 154 is near this manifold 112 or at this manifold 112, but the user 102 still has to double check using the method 100 described herein to determine with accuracy the location of the leak 154 with respect to the manifold 112 tested and shown in FIG. 6. As noted above, in some cases, there may be very clear signs a leak is located in a particular room or area of a house or other property having fixtures 122. There may be warm floors or there may be an audible loud noise coming through the walls that is discernible to the bare ear, or there may be signs of mold or mildew. These are all just examples and further examples have been described above to help the user 102 narrow down which manifold 112 to pick and identify as a first testing manifold 112 to begin performing temperature checks on the hot side or cold side.

FIG. 6 includes pipelines 114a and 114b. The user 102 may use a torch, as shown in FIG. 6, which is an example of a heating element 132 to test the cold-water manifold 112 and may heat each pipeline 114a and 114b of the manifold 112 as evenly as possible. The pipelines 114a-114b are shown as coming out of the slab or foundation 106 and are part of the same manifold 112. Riser 604 is a special pipe that transports water from the feed line 116, to the control valve 124, to a supply line 120, and then to a fixture 122.

In a non-limiting embodiment, the user 102 may first clean the pipes (as noted above in FIGS. 4-5) to ensure that the pipes 114 are not covered with any slime or sludge or concrete or another element that can prevent the heating element 132 (or cooling element 134 if used for hot water pipes 114) from changing the temperature accurately of the pipelines 114a-114b as part of the temperature testing process of method 100 shown in FIG. 1 and discussed above. Next, the user 102 can torch or heat the connected pipelines 114a-114b using torch 132 and proceed to read the temperature of the heated pipelines 114a-114b. As noted above, there may be a number of ways to read the temperature of the heated pipelines 114a-114b. The user 102 may use his or her sense of touch 142 and use his hands to feel the temperature after torching the pipelines 114a-114b. Alternatively, or even additionally, in other non-limiting embodiments, the user 102 may utilize temperature testing equipment 144 which may include infrared thermometers or temperature readers to determine if any temperature change occurred to the heated pipelines 114a-114b.

As noted above, an important principle of the method 100 is that an underground leaking pipe 126 will constantly pull water through a pipeline towards the leak 154. In FIG. 6, if the leak 154 is before the manifold 112 shown in FIG. 6, then neither pipelines 114*a*, 114*b* will cool down faster than a normal rate of heat dispersion after the heating element 132 (i.e., the torch) is utilized to heat the pipelines 114*a*-114*b* and fixture 122 is off as water is not flowing to the pipelines 114*a*-114*b*, because then water is not flowing through the pipelines 114*a*-114*b* in the absence of any water fixture 122 being turned on.

If the leak 154 is present after the manifold 112 shown in FIG. 6 and the manifold 112 is before the leak 154, then both pipelines 114 would cool down after the heating element 132 is utilized to heat the pipelines 114*a*-114*b* and the fixture 122 is off, because cool water is flowing through the pipelines 114*a*-114*b* to get to the leak 154 and the user 102 can detect that change in temperature (the cooling of heated pipelines 114*a*-114*b*) using touch 142 or temperature testing equipment 144. As stated above, it is noted that this can be safely assumed in a controlled testing environment where no fixtures 122 are turned on for this part of the test. Further, the user may perform a control test to see how fast pipelines 114 normally close down. If a pipeline 114 cools down much quicker in comparison with the typical cool down rate for the pipeline 114, then the user/tester can determine that water may be flowing through that pipeline 114 towards the leak 154 (i.e., in the absence of water from fixture 122 being turned on also).

The user 102 has to still determine which pipeline 114*a* or 114*b* of the manifold 112 shown in FIG. 6 is the feedline 116 and which pipeline 114 is the distribution line 118. As shown in FIG. 6, the pipelines 114*a* and 114*b* are the same sizes (i.e., one does not have a larger diameter than the other) so the user 102 cannot safely assume that one pipe 114 is the feedline 116 and one pipeline 114 is the distribution line 118 without conducting further testing. Accordingly, the user can turn on the fixture 122 using the knobs or other selectors at the fixture 122. In FIG. 6, the fixture 122 is not shown but supply line 120 is shown and it is connected to a fixture 122.

So, after determining that the manifold 112 is before or after the leak 154, to determine which pipelines 114 are feedlines 116 or distribution lines 118, the user 102 has to perform another time temperature test with the fixture 122 turned on. Once the fixture 122 is turned on and the cold water begins to flow, the user 102 may torch the pipelines 114*a* and 114*b* again and immediately feel both pipelines 114*a* and 114*b*. In our example, the pipeline line 114*a* will be noticeably very cold to the touch 142 or cool down much quicker than 114*b* even though this pipeline 114*a* was just heated with a blow torch 132 as it is supplying the cold water to the fixture 122 that has been turned on. At the same time, the pipeline 114*b* that has been torched will be warmer and stay hot longer and then begin to cool down. With this information, the user 102 can safely assume that the pipeline 114*b* is a distribution line 118 while the pipeline 114*a* is the feed line 116. The user 102 can mark this pipeline 114*b* (e.g., with tape, a rag, marker) as a pipeline 114 that is possibly connected to the pipe 126 running underground that contains the leak 154 and make a note that the underground leaking pipe 126 is after this pipeline 114*b* and this identified cold water manifold 112. The user 102 cannot be absolutely sure that the marked pipeline 114*b*, which is a distribution line 118, is Point A 170 (i.e. the pipeline 114 that enters the slab or foundation 106 and connects to the underground leaking pipe 126) and leads to Point B 172 (i.e. the pipeline 114 that has to be a feed line 116 and that exits the slab or foundation 106 on a second manifold 112 that connects to the underground leaking pipe 126) until the user 102 runs further tests to make sure that there are not any intervening manifolds 112 between this identified manifold 112 and performs a process of elimination test as further elaborated on below. As an alternative to performing a process of elimination test, there may be other clear signs of leaking in the location where the identified manifold 112 shown in FIG. 6 that can help the user 102 determine that the distribution line 118 and pipeline 114*b* is Point A 170 on the property 104. 89

FIG. 7 shows an example of a manifold 112 having three pipelines 114*a*, 114*b*, 114*c*. Further, FIG. 7 shows riser 604 which connects to angle stop 124 and takes water to a fixture 122. A supply line 120, as shown in FIG. 7, allows water to flow through to the fixture 122 from the riser 604.

In FIG. 7, the pipelines 114*a*-114*c* are part of the same manifold 112 and are exiting the slab or foundation 106. The user 102 only knows that the pipelines 114*a*, 114*b*, 114*c* are bringing or taking water to either a fixture 122 or another location but may not know which pipeline 114*a*, 114*b*, 114*c*, is feeding the underground leaking pipe 126. In FIG. 7, the user 102 does not know which pipelines 114*a*, 114*b*, and 114*c* are connected to the leak 154 prior to using the detection methods 100 described herein and shown in FIG. 1. Accordingly, as a first step, the user 102 should preferably clean the pipelines 114*a*, 114*b*, and 114*c* for accuracy. Next, the user 102 has to use a heating element 132 to heat the cold water pipelines 114*a*, 114*b*, and 114*c* as the user 102 has determined that this manifold 112 is a cold-water manifold 112. It is noted that the heating elements 132 are used on cold water manifolds 112 and cooling elements 134 are used on hot water manifolds 112.

In the example of FIG. 7, with the knowledge that the connected fixture 122 is turned off in a controlled testing environment and water is able to flow to the property 104 and that the water is pressurized flowing through the property 104, the user 102 may heat pipelines 114*a*, 114*b*, and 114*c* as evenly as possible with the torch 132 and then feel using touch 142 or using temperature testing equipment 144 the pipelines 114*a*, 114*b*, and 114*c* after evenly heating the pipelines 114*a*, 114*b*, and 114*c* of manifold 112 shown in FIG. 7. It is noted that each pipeline 114 can be heated one by one and tested independently of each other. In the example shown in FIG. 7, almost automatically after heating the pipelines 114*a*, 114*b*, and 114*c* to determine if there has been a change in temperature, the pipelines 114*a* and 114*c* begin to cool down while the interior pipeline 114*b* stays hot. Accordingly, based on this acquired knowledge, the user 102 can assume that pipelines 114*a* and 114*c* are connected to the leak 154 as the water is being pulled through those pipes 114 towards the leak 154 and is cooling the metal pipelines 114*a* and 114*c*. Next, the user 102 has to determine which pipeline 114 is the feedline 116 and which is the distribution line 118. As they are both the same sizes, the user 102 cannot safely assume that a bigger sized pipeline 114 is the feedline 116 and so the user 102 must conduct the same test as shown in FIG. 6. Accordingly, to determine which pipeline 114 is a feedline 116 and which pipeline 114 is a distribution line 118, the user 102 turns on the fixture 122 using the control valve 124, shown in FIG. 7 to cause cold water to flow through the supply line 120 to the connected fixture 122. Upon doing so, the user 102 torches or otherwise heats up the pipelines 114*a* and 114*c* again. In this example, the pipeline 114*c* becomes very cool almost immediately after being heated up with the fixture 122 on, while the other pipeline 114*a* slowly cools down. With this information, the user 102 can safely assume that pipeline 114*c* is the feedline 116 to the fixture 122 and the other pipeline 114*a* is a distribution line 118 that is pulling water to the underground leaking pipe 126. Notably, the leaking pipeline 126 can only be marked safely by the user 102 (detector) after performing such tests. FIG. 7 shows an indication of a leak on pipeline 114a for purposes of illustration, but it is noted that the underground leaking pipe 126 would be beneath the slab or foundation 106 and would not be above ground as shown in FIGS. 6-7.

FIG. 8A provides another visual example of the method 100 being implemented at a property 104 that includes half-bath 850. The half-bath 850 includes two main fixtures 122, which are toilet fixture 840 and a half-bath sink fixture 842 as shown in FIG. 8A. FIG. 8B shows a complete listing of all the other fixtures 122 included on the property 104 that includes the half bath 850 and is used to further show a process of elimination to narrow down the identification and detection of Point A 170 and Point B 172. It is noted that FIG. 8A-FIG. 9 and the other figures shown herein are not shown exactly to scale. As such, the manifolds 112 and fixtures 122 shown therein are exaggerated for purposes of pictorial illustration.

As shown in FIG. 8A, in this example, the user 102 may begin by testing the cold-water manifold 112a at the main inlet 108 coming out of the slab or foundation 106. The user 102 may determine through temperature test checks after applying a heating element 132 to the pipelines 114a, 114b, and 114c of cold water manifold 112a in FIG. 8A that cold water is flowing or moving at some rate (due to the leak 154 in the unseen, underground leaking pipe 126). By performing time based temperature checks, the user 102 may determine that pipeline 114c has water flowing down towards the leak 154 at the main water entrance 108 to the property 104 and through pipeline 114c. The user 102 can safely assume that the leak 154 is past pipeline 114c and manifold 112b based on the time-based temperature checks that are performed, similar to the time based temperature or tests described above for FIGS. 6-7. The user 102 has to next identify a next manifold 112 to test. In this exemplary scenario shown in FIG. 8A, the user 102 may have used audio equipment 130 and/or a utility locator 128 and identified there was a loud noise and/or other signs of a leak 154 (e.g., such as water leakage on a floor) in the half bath 850 and is confident that the user can begin testing at manifold 112b which is a manifold 112 dedicated to taking water to the toilet fixture 840 as shown in FIG. 8A. In a non-limiting example, the user 102 may have used audio equipment 130 to listen to the floors of the bathroom having toilet fixture 840 and to listen to the control valve 124 under the toilet fixture 840 and heard a loud sound coming from the cold-water pipelines 114d, 114e of manifold 112b and so the user 102 can safely assume it is prudent to open up the wall and expose manifold 112b at the toilet 840 and identify manifold 112b as a first test manifold 112b. If the first test manifold 112b is in the bathroom, then the user 102 can likely assume the manifold 112b is dedicated to taking water to the toilet fixture 840 and/or another fixture in the bathroom. The cold-water main inlet 108 provides cold water that is directed in the direction of arrow 804 as shown in FIG. 8A towards the toilet manifold 112b. Notably, the user 102 does not have a map indicating that manifold 112b is where it is nor are there signs or markings indicating this to the user 102. The user 102 has to have the knowledge explained herein about manifolds 112 and fixtures 122 to proceed.

The user 102 may know that toilet fixtures, such as toilet fixture 840, only receive cold water and can safely assume that this manifold 112b is a cold-water manifold and the user 102 will use heating elements 132 when performing the time based temperature checks. The manifold 112b shown in FIG. 8A has two pipelines 114d and 114e. First, the user 102 may choose to clean the pipelines 114d, 114e of manifold 112b. Next, the user 102 has to perform temperature checks using the heating element 132 to heat up each of the pipelines 114d, 114e to heat pipelines 114d, 114e as evenly as possible. Next, the user 102 may assess the temperature of the heated pipelines 114d, 114e quickly after a few seconds so as not to allow too much time to pass before reading the temperature of the pipelines 114d, 114e. The temperature of the pipelines 114d, 114e may be detected using touch 142 or temperature testing equipment 144 according to one or more non-limiting embodiments.

In this exemplary scenario shown in FIG. 8A, the pipelines 114d,114e will both slowly cool down which indicates to the user 102 that the leak 154 is past this manifold 112b, because the pipelines 114d,114e did not stay hot. Instead, the pipelines 114d,114e had a change in temperature and cooled down even without the toilet fixture 840 being turned on (e.g., flushing of the toilet to run water therethrough) indicating that the leak 154 in underground leaking pipe 126 is pulling cold water through pipelines 114d,114e towards the leak 154 in underground leaking pipe 126.

The user 102 has to next determine which pipeline 114d, 114e is the feed line 116 and which pipeline is the distribution line 118. To do so, the user 102 may torch or heat both pipelines 114d, 114e, flushing the toilet fixture 840 (i.e., engaging with or activating the cold-water lines of the fixture 840) and finding out which pipeline 114 instantly cools down and which pipeline 114 slowly cools down. The different rate in temperature change of pipelines 114 helps the user to determine which pipeline 114 is directing water to a fixture 122 or toilet 840 and is a feedline 116 and which pipeline 114 is a distribution line 118. The user 102 determines, after heating the pipelines 114 and flushing the toilet fixture 840, that pipeline 114d is the feed line 116 as it instantly cools down and that the pipeline 114e on manifold 112b is the distribution line 118 as that pipeline 114e cooled down more slowly at a slower rate than pipeline 114d. Notably, the pipelines 114d, 114e have the same diameter. If it had been the case that pipeline 114d is the larger sized pipeline 114, and pipeline 114e is the smaller pipeline 114, then the user 102 did not have to perform the extra temperature test of heating the pipelines 114d, 114e again and flushing the toilet fixture 840, as the user 102 could safely assume the larger sized diameter was a feedline 116 to the half-bath toilet fixture 840.

The user 102 then waits for the toilet fixture 840 to stop running. The user 102 has to be able to clearly mark Point A 170, but at this point only knows that pipeline 114e could possibly be Point A 170 as it is a distribution line 118 and not a feedline 116. Accordingly, the user 102 continues to test manifolds 112 near this manifold 112 and determine which pipelines 114 of those manifolds 112 cool down after being heated and which pipelines 114 are the feed lines 116 and which pipelines 114 are the distribution lines 118 for those manifolds 112. The user 102 may also utilize utility locator 128 to follow the pipelines 114 and determine which manifold 112 to test next or look for other signs of a leak 154. Eventually, the user 102 tests manifold 112c as shown in FIG. 8A. At manifold 112c, the user 102 performs a temperature test on pipelines 114f, 114g, 114h after preferably cleaning the pipelines 114f-114h. The user 102 heats up pipelines 114f,114g, 114h and determines that all of the pipelines 114f,114g, 114h stay hot and do not cool down at a rate which would indicate water is flowing through the pipelines 114f, 114g, and 114h. Accordingly, there is no temperature change at this manifold 112c and the user 102 knows that this manifold 112c has to be past or after the leak 154 and that the leak 154 is before this manifold 112c. Notably, to test any of these manifolds 112b, 112c the user has to open up the walls (using cutting tools) and expose these manifolds 112b and 112c for temperature tests and checking.

As all of the pipelines 114f-114h are the same size, the user 102 next must determine which pipelines 114f, 114g, 114h is a feedline 116 and which pipelines 114f, 114g, 114h are distribution lines 118. The user 102 may torch or heat all the pipelines 114f, 114g, and 114h and turn on the cold water of the half-bath sink fixture 842. Next, the user 102 uses touch 142 or temperature reading devices 144 to determine that one pipeline 114f instantly cools down (because it is the feed line 116 having the most flow of cold water flowing through it to the half-bath sink fixture 842 when the half-bath sink fixture 842 is on) and which other pipelines 114g and 114h stayed warm/hot with no temperature changes. The user 102 determines that 114f is the feedline 116 as it instantly cooled down due to the fast rate of cold water flowing up the feedline 116 to the half-bath sink fixture 842 and that the other two pipelines 114g and 114h are distribution lines 118 as they stayed warm. After exposing the manifold 112c at the half-bath sink fixture 842 and then the toilet fixture 840, the user 102 has determined that the underground leak 154 is past the manifold 112b at the toilet fixture 840 and in the distribution line 118 of that manifold 112b (i.e., pipeline 114e). Further, the user 102 has determined that 114e goes directly to the manifold 112c at the half-bath sink fixture 840 and that line 114f is a feed line 116 for manifold 112c and that manifold 112c is located past the leak 154 (i.e., the leak 154 is before manifold 112c). Accordingly, the user 102 can safely assume, in this example, that the underground leak 154 is between the pipeline 114e and is Point A 170 and pipeline 114f, and is Point B 172. As shown in FIG. 8A, the pipeline 114e enters the slab or foundation 106 and is directly connected to the inlet of the underground leaking pipe 126 (which is not visible to the eye without opening up the floors of the property 104) and continues to lead to the exiting pipeline 114f of manifold 112c, whereby the exiting pipeline 114f is the feed line 116 to half bath sink fixture 842. Further, there are no intervening manifolds 112 between Point A 170 and Point B 172. The user 102 will mark the pipeline 114e as Point A 170 with tape or another marker and also mark pipeline 114f as Point B 172 with tape or another marking element. The property owner 140 can use these markers of Point A 170 and Point B 172 to determine with the repairmen or other parties whether to perform a reroute aboveground and install a new set of pipes aboveground that connects Point A 170 and Point B 172 or to repair/replace the underground leaking pipe 126 directly. This decision of the property owner 140 may depend on several factors including cost of a reroute versus repair/replacement of the underground leaking pipe 126 and other expenses.

FIG. 8B shows an example of testing the cold-water lines to locate Point A 170 and Point B 172, their respective Point A manifold 150 and Point B manifold 152, and which fixtures 122 are connected to Point A 170 and Point B 172, and the location of the underground leaking pipe 126.

FIG. 8B shows an example of a property 104 including the half-bath 850 shown in FIG. 8A, which may include half bath toilet fixture 840 and half bath sink 842 as shown in FIG. 8A. The property 104 shown in FIG. 8B further includes a full listing of all the other fixtures 122 on the property 104 and also further describes an exemplary process of elimination and narrowing down through a series of temperature checks to determine where Point A 170 and Point B 172 are located, and more specifically, where their respective Point A manifolds 150 and Point B manifolds 152 are located. In one exemplary scenario, if there are not any clear signs and indication of a leak 154 being present in the half-bath 850 in FIG. 8A due to the presence of a loud sound ascertained by a user using audio equipment 130, in one non-limiting embodiment, or a loud sound discernible to the ear, for example, then a user may have to perform a full process of elimination test in order to assess where the distribution lines 118 of each manifold 112 direct water to (i.e. to which fixture 122 on the property 104), using the following exemplary method as a guide.

In a non-limiting embodiment, the property 104 in FIG. 8B includes 10 fixtures, including one half bathroom 850 which includes a half-bath toilet 840 and half-bath sink 842. Further, the property 104 includes one full master bathroom 852, which includes master bath sink 814, master bath toilet 816, and master bath shower 818 as shown in FIG. 8B. Further, the property includes one washing machine 822, one kitchen sink 820, one hot water heater 110 (whereby a hot water heater 110 is an example of a fixture 122), and a first hose bib 810 and a second hose bib 812 located on the exterior of the house/property 104. Accordingly, there are 10 fixtures on the property 104 shown in FIG. 8B. It is noted that the water main inlet 108 is not considered a fixture for testing because if there is a leak in the property 104, it must be past the water main inlet 108.

The user first assesses and determines whether the leak 154 is likely present on the hot side or the cold side. The user 102 may ascertain that the leak 154 is on the cold-water side using the one or more methods described already above. Next, the user 102 has to determine where the leak 154 is located and use a process of elimination to narrow down to a set of possible fixtures 122 on property 104 in FIG. 8B that include the Point A manifold 150 and Point B manifold 154.

In order for the user to determine where a distribution line 118 that has water flowing through the distribution line 118 to get to the leak 154 is going, the user 102 has to temperature check each pipeline 114a-114c of the manifold 112a and compare the results one by one with each fixture 122 present on the property 104. As noted above, the user 102 takes stock that there are 10 fixtures 122 on the property, including, the half bath toilet 840, half bath sink 842 as shown in FIG. 8A, and also hose bib 1 810, hose bib 2 812, master bath sink 814, master bath toilet 816, master bath shower 818, kitchen sink 820, washing machine 822, and hot water heater 110 as shown in FIG. 8B.

With no clues as to where to start and which manifolds 112 to start testing (e.g., due to the lack of a hissing noise that can be heard with the bare ear, no warm floors, no flooding, no use of audio equipment 130, etc.), the user 102 may first begin at the main cold water inlet 108 shown in FIG. 8B to get an idea of what is going on and may perform a temperature test using a heating element 132 to heat up the pipelines 114a, 114b, 114c of the main water inlet manifold 112a bringing water from the main water inlet 108 into the property 104. It is noted that because this is the main water inlet 108, there is no feedline 116 and water from the main cold water inlet 108 will be flowing down all three lines 114a 114b and 114c of the main water manifold 112a.

After torching or otherwise heating all three pipelines 114a,114b,114c (e.g., because it has been ascertained that the leak 154 is on the cold water side and a heating element 132 is needed), the user notes that pipeline 114c has noticeably cooled down after being heated with the heating element 132 while pipelines 114a and 114b of the cold water manifold 112a in FIG. 8B stayed warm. This indicates that water is flowing through 114c and eventually getting to the leak 154. Next, the user must determine where this distribution pipeline 114c is going and determine what pipelines (114a-114c) in the main manifold 112a bring water to each fixture 122 on the property 104 by turning on each fixture 122 one at a time, performing a time based temperature check, determining which pipelines 114 are feed lines 116 and which pipelines 118 are distribution lines 118 that transport water to another manifold 112, and comparing the results.

In this example, the user 102 may proceed by selectively turning on the half bath vanity sink 842's cold water and test all pipelines 114a-114c in the cold water manifold 112a of the water main inlet 108. The result, in this exemplary scenario, is that pipelines 114a-b stay warm while pipeline 114c of the manifold 112a instantly cools down. With this information the user 102 has determined that pipeline 114c, at some point, brings water to the half bath vanity 850 and to the half bath vanity sink 842, because the act of turning on the associated fixture 122, which is the half bath sink 842, and temperature testing pipelines 114a-114c of the cold water manifold 112 indicates that the pipeline 114c cools down in order to distribute/transport water to the half bath vanity sink 842.

Next, the user may turn off the half bath vanity sink 842, then flush the half bath toilet 840 (which only uses cold water) and temperature test all pipelines 114a-114c in manifold 112a. The result is that pipelines 114a-b stayed warm while pipeline 114c instantly cooled down. With this information, the user has determined that pipeline 114c, at some point, brings water to the half bath toilet 840. Next, the user may turn off the half bath toilet 840 or wait for the half bath toilet 840 to turn off, and then turn on hose bib 1 810 (which is cold water) and temperature test all the pipelines 114a-114c in manifold 112a. The result is that pipelines 114a-114b stayed warm while pipeline 114c instantly cooled down.

With this information, the user has determined that pipeline 114c, at some point, brings water to hose bib 1 810. Next, the user may turn off hose bib 1 810 and turn on hose bib 2 812 and test each pipeline 114a-114c in manifold 112a at the cold water inlet 108. The result is 114a-114b stayed warm while pipeline 114c instantly cooled down. With this information, the user has determined that pipeline 114c, at some point, brings water to hose bib 2 812. Next, the method may include turning off hose bib 2 812 and turning on the cold water faucet or knob for the master bath vanity sink 814 and temperature testing all the pipelines 114a-114c in manifold 112a. The result is pipeline 114a stayed warm, while pipeline 114b instantly cooled down, and pipeline 114c slowly cooled down. Accordingly, the rate of cooling down is different between the pipelines 114a-114c and means that one pipeline 114 of the manifold 112a is directing water to the fixture 122 (i.e., master bath vanity sink 814). With this information, the user has determined that pipeline line 114b of the cold water manifold 112a, at some point, brings water to the master bath vanity sink 814.

The next step may include turning off the master bath vanity sink 814 and flushing the master bath toilet 816 (which only uses cold water) and temperature testing all the pipelines 114a-114c on manifold 112a. The result is pipeline 114a stayed warm, pipeline 114b instantly cooled down, and pipeline 114c slowly cooled down when a heating element 132 is applied to the pipelines 114a-114c of the cold main water manifold 112a. With this information, the user has determined that pipeline 114b, at some point, brings water to the master bath toilet 816, because flushing the master bath toilet 816 (i.e., turning this fixture 122 on) and temperature testing the pipeline 114 indicates an instant cooling of the pipeline 114 showing that water is being distributed to the master bath toilet 816 from pipeline 114b.

The next step may include turning off the master toilet 816 or waiting for the master toilet 816 to turn off, and then turning on the master bath shower 818 (i.e., its cold water) and temperature testing all the pipelines 114a-114c on manifold 112a. The result is pipeline 114a stayed warm, pipeline 114b instantly cooled down, and 114c slowly cooled down.

With this information, the user has determined that line 114b, at some point, brings water to the master bath shower 818. The next step may include turning off the master bath shower 818 and turning on the cold water of the kitchen sink 820 and temperature testing all the pipelines 114a-114c on manifold 112a. The result is pipeline 114a instantly cooled down, pipeline 114b stayed warm, and pipeline 114c slowly cooled down. With this information, the user has determined that pipeline 114a, at some point, brings water to kitchen sink 820. Next, the method and process of elimination may include turning off the kitchen sink 820 and turning on the cold water for the washing machine 822 and temperature testing all the pipelines 114a-114c in manifold 112a. The result is pipeline 114a instantly cooled down, pipeline 114b stayed warm, and pipeline 114c slowly cooled down.

With this information, the user has determined that pipeline 114a, at some point, brings water to the washing machine 822. Next, the process of elimination may include turning off the washing machine 822 and turning on the water heater 110. It is noted for the user 102 to turn on the water heater 110, the user 102 simply needs to run hot water anywhere in the house/property 104. Water will then flow through the water heater 110 to get to the desired destination. Next, the user temperature tests all the lines 114a-c in manifold 112a. The result is 114a instantly cooled down, 114b stayed warm, and 114c slowly cooled down. With this information, the user has determined that line 114a, at some point, brings water to the washing machine 822.

To summarize, the user has now determined that cold water flows through pipeline 114a to get to the cold water inlet 108 at the water heater 110, cold water inlet 108 for the washing machine 822, and cold water inlet 108 for the kitchen sink 820, through pipeline 114b to get to the cold water inlet 108 for the master vanity sink 814, cold water inlet 108 for the master bath shower 818, and the master toilet 816. Further, the user 102 has determined that cold water flows through pipeline 114c to get to the leak 154, as well as get to the half bath vanity sink 842 and toilet 840 as well as hose bib 1 810 and hose bib 2 812. Because of this process of elimination and testing of each fixture 122's distribution lines 118 (pipelines 114a-114c from cold water manifold 112a) and where the water goes, the user knows that the leak 154 is past pipeline 114c from the initial temperature check, and that pipeline 114c brings water to the half bath vanity sink 842, the half bath toilet 840, and hose bib 1 810 and hose bib 2 812.

Accordingly, the user only needs to focus on those four fixtures 122, which are half bath vanity sink 842, the half bath toilet 840, and hose bib 1 810 and hose bib 2 812, to determine and test where distribution pipeline 114c actually goes to first. As noted above, the process of elimination test requires the user to locate a pipeline 114 that leads to a leak 154 by performing an initial temperature test and then identify all the distribution lines 118 for any manifolds 112 of connected fixtures 112 that have water going to and from via the distribution lines 118 of the manifolds 112 and through the connected underground portions of the pipeline 114.

With the knowledge that the user 102 should focus on the four fixtures 122 shown in FIG. 8B and identified as half bath vanity sink 842, the half bath toilet 840, and hose bib 1 810 and hose bib 2 812. The user 102 may open up the walls at any one of the four areas that 114c takes water to in order to specifically test the manifolds 112 for these four fixtures, which are half bath vanity sink 842, the half bath toilet 840, and hose bib 1 810 and hose bib 2 812. It is noted that the user 102 could have also used a utility locator 128 to follow pipeline 114c and determine which fixtures 122 are connected via the pipeline 114c.

Accordingly, the user 102 can temperature test the pipelines 114 of all of the manifolds 112 for the half bath vanity sink 842, the half bath toilet 840, hose bib 1 810, and hose bib 2 812 to see if the leak 154 is before or after each manifold 112 of each fixture 112 and to identify Point A 170 and Point B 172.

For example, if the user starts at or continues with the half bath toilet 840, the user 102 will open up the wall in the half-bath 850 and expose the manifold 112b (as shown in FIG. 8A) at the half bath toilet 840. The manifold 112b for the half-bath toilet 840 may have two lines going into the slab/foundation 106, which are pipelines 114d and 114e as shown in FIG. 8A. The user 102 may perform a temperature test on pipelines 114d,114e to see if the leak 154 is past this manifold 112b or before this manifold 112b. The result is the leak 154 proves to be past this manifold 112b as both lines 114d, 114e slowly cool down (but faster than normal rate of cool down) when a heating element 132 is applied to the pipelines 114d, 114e. Next, the user 102 has to determine which pipeline 114d,114e is the feedline 116 and which is the distribution 118 by torching using a torch or other heating element 132 both pipelines 114d, 114e, flushing the half bath toilet 840 as shown in FIG. 8A and FIG. 8B, and finding out which one instantly cools down and which one slowly cools down (thus comparing the rate of cool down). The user 102 determines that pipeline 114d is the feedline 116 as it instantly cools down and pipeline 114e is the distribution line 118 as pipeline 114e slowly cools down after the associated fixture 122 or half bath toilet 840 is activated. Accordingly, the user 102 may continue performing temperature tests with the other fixtures (other than the half bath toilet 840 that the user 102 just tested) that the pipeline 114c feeds water to, which are the half bath vanity sink 824, hose bib 1 810, and hose bib 2 812, in order to determine where pipeline 114e takes water to. The results show 114e instantly cools down when the half bath cold sink 842 is on, as well as when hose bib 1 810 and 812 are on. This means that 114e at some point provides water to the half bath cold sink 842, as well as hose bib 1 810 and 2 812. Next, the user 102 may expose the manifold 112 at any location pipeline 114e takes water to (e.g., half bath sink 842, and hose bib 1 810 and hose bib 812) and temperature test on the specific pipelines 114 of the exposed manifold 112, then turn on the cold water of the respective fixture 122, and determine where the water is flowing through. The user would perform the same temperature test on the pipelines 114 of any manifold 112 for the half bath vanity sink 842, or hose bib 1 810 or hose bib 2 812.

If the user started or continued at the half bath vanity sink 842, the user may open up the wall and expose the manifold 112c at the half bath vanity sink 842 as shown in FIG. 8A. As shown in FIG. 8A, the half bath vanity sink 842 has three pipelines 114f, 114g, and 114h going into the slab/foundation 106. Accordingly, the user may perform a temperature test on pipelines 114f, 114g, 114h to see if the leak 154 is past this manifold 112c, as shown in FIG. 8A, or before. The result is the leak 154 is before this manifold 112c (or in other words manifold 112c is past the leak 154) as none of the pipelines 114f-114h cool down, when the half bath vanity sink 842 is turned off and a heating element 132 is applied to the pipelines 114f-114h, indicating there is no water flowing through pipelines 114f-114h in the absence of the fixture 842 being turned on. Next, the user 102 may determine which pipeline 114f-114h is the feedline 116 and which is the distribution line 118 by torching all three pipelines 114f-114h, then turning on the half bath sink 842's cold water, and finding out which pipeline 114f-114h instantly cools down and which ones stayed warm. After doing so, the user 102 determines that pipeline 114f is the feed line 116 as pipeline 114f almost instantly cools down, and also determines that pipelines 114g-114h must be the distribution lines 118 as these pipelines 114g-114h stayed warm. It is reiterated that a manifold 112 will only have one feedline 116 and the rest of the pipelines 114 will be distribution lines 118.

Next, the user 102 may assess and determine where pipelines 114g-h of the manifold 112c distribute water to, by temperature testing pipelines 114g-h when the hose bib 810 is turned on. The results show that both pipelines 114g and 114f cool down when hose bib 1 810 is on, and pipelines 114f and 114h cool down when hose bib 2 812 is on. Since we know 114f is the feedline 116, this must mean that 114g takes water to hose bib 1 810 and 114h takes water to hose bib 2.

Knowing the leak 154 is before this manifold 112c as previously determined and knowing that hose bib 1 810 and hose bib 2 812 are after this manifold 112c, the user 102 now must open up at the only option left that pipeline 114c feeds, which is the toilet 840. After exposing the manifold at the vanity 112c then the half bath toilet 840, the user has determined that the leak 154 is past the manifold 112b at the half bath toilet 840 and in the distribution (118) line 114e, and 114e goes directly to the manifold 112c at the half bath sink 842, and that pipeline 114f is the feed line (116) for manifold 112c. Thus, the leak 154 is between line 114e (point A 170) and 114f (point B 172) (which is shown in FIG. 8A) without any intervening manifolds 112.

After opening up at these areas and performing temperature checks, the user 102 tries to determine 1) if the leak 154 is past or before said manifold 112 2) which one pipeline 114 is the feedline 116 and which pipeline(s) 114 are the distribution lines 118 and 3) which pipelines 114 in each manifold 112 take water to other fixtures 122 on the property 104. With the information those three tests provide for each manifold 112 associated with each fixture 122 on the property 104, the user 102 can determine exactly where the pipeline 114 with the leak 154 enters the ground (point A 170) and exactly where the pipeline 114 with the leak 154 exits the ground (point B 172) of the slab/foundation 106. Accordingly, this is an exemplary method of using process of elimination to detect and deduce Point A 170 and Point B 172.

FIG. 9 provides another example for using the method 100, as described herein in one or more non-limiting embodiments to detect an underground leaking pipe 126 by testing a hot water manifold that is connected to a hot water heater 110 outlet. In FIG. 9, the user 102 has decided to start or has determined that the leak is most likely coming from the hot water side of the hot water heater 110 using one or more methods noted above.

Accordingly, the user 102 may locate the hot water manifold 112*a* which has pipelines 114*a*, 114*b* and 114*c*. It is noted that a hot water manifold, such as hot water manifold 112*a* shown in FIG. 9, it safe to assume that the water always flows in one direction and flows down in the direction of flow shown for 902 in FIG. 9. Accordingly, the user 102 can safely assume there are no feedlines 116 on manifold 112*a* and that there are only distribution lines 118 on manifold 112*a* as shown in FIG. 9. The user 102 may temperature test pipelines 114*a*, 114*b*, and 114*c* of the hot water heater 110 by applying a cooling element 134 and determining that pipeline 114*c* heats up slowly while the other two pipelines 114*a* and 114*b* do not heat up and stay cool (i.e., do not exhibit temperature change). After performing this initial temperature test, the user 102 knows that pipeline 114*c* is a distribution line 118 and is most likely the pipeline 114 leading to the leak 154 because of the temperature change. Further, because the manifold 112*a* is the manifold 112 for the hot water heater 110 and as noted above all the pipelines 114 for a hot water manifold 112 are distribution lines 118, the user 102 can safely assume that pipeline 114 is a distribution line 118 and does not have to further determine if there is a feedline 116 for this manifold 112*a*.

Next, the user 102 locates and identifies manifold 112*b* for temperature testing as being the next manifold 112 that the distribution line 114*c* of manifold 112*a* has water flowing through. The user examines manifold 112*b*. The user may perform a temperature test by cooling down the pipelines 114*d*, 114*e*, and 114*f* of manifold 112*b* using any type of cooling element 134, including, but not limited to, ice cubes, cold towels, or other cooling elements. After cooling the pipelines 114*d*, 114*e*, and 114*f* while the sink 122*a* is turned off, the user 102 notices that none of the pipelines 114*d*, 114*e*, and 114*f* heat back up after a cooling element 134 is applied to the pipelines 114*d*, 114*e*, and 114*f*. Instead, all of the pipelines 114*d*, 114*e*, and 114*f* stay cold if not room temperature. In another embodiment, the user 102 does not apply a cooling element 134. Rather, the user 102 can feel the pipelines 114*d*-114*f* of manifold 112*b* and notices none of them are hot as the leak is before this manifold 112 and no hot water is flowing through these pipelines 114 to heat them up. The user 102 can safely assume that the manifold 112*b* is after the leak 154 (i.e., the leak 154 is before manifold 112*b*).

The user 102 must next determine which pipeline 114*d*-114*f* is the feed line 116 and which pipeline 114*d*-114*f* is the distribution line 118. The user 112 can turn on the hot water of the sink fixture 122*a* and feel the manifold pipelines 114*d*-114*f*. In this example, the pipeline 114*d* will eventually or very quickly feel very hot (because the water is flowing to fixture 122*a* through pipeline 114*d*) while the other two pipelines 114*e* and 114*f* will not be as hot or not hot at all when the hot water on the sink 122*a* is turned on. Accordingly, the user 102 can assume that pipeline 114*d* is the feedline 116. After performing conclusive process of elimination testing, the user 102 knows that there are no intermediate manifolds 112 between the hot water heater manifold 112*a* and the sink manifold 112*b*. Accordingly, the user 102 can mark pipeline 114*d* as Point B 172 as shown in FIG. 9 and can mark pipeline 114*c* as Point A 172 on manifold 112*a*. These markings of Point A 170 and Point B 172 can assist the property owner 140 to determine what type of repairs to make and exactly where the repairs need to be made (i.e., where the underground leaking pipe 126 is located exactly). FIG. 9 shows that Point A 170 is always a distribution line 118 that distributes water to the feedline 116 of Point B 172, whereby the underground pipeline 114 is connected at the inlet and outlet of the underground leaking pipe 126 via the distribution line 118 of Point A 170 and via the feedline 116 of Point B 172.

Figure 10:
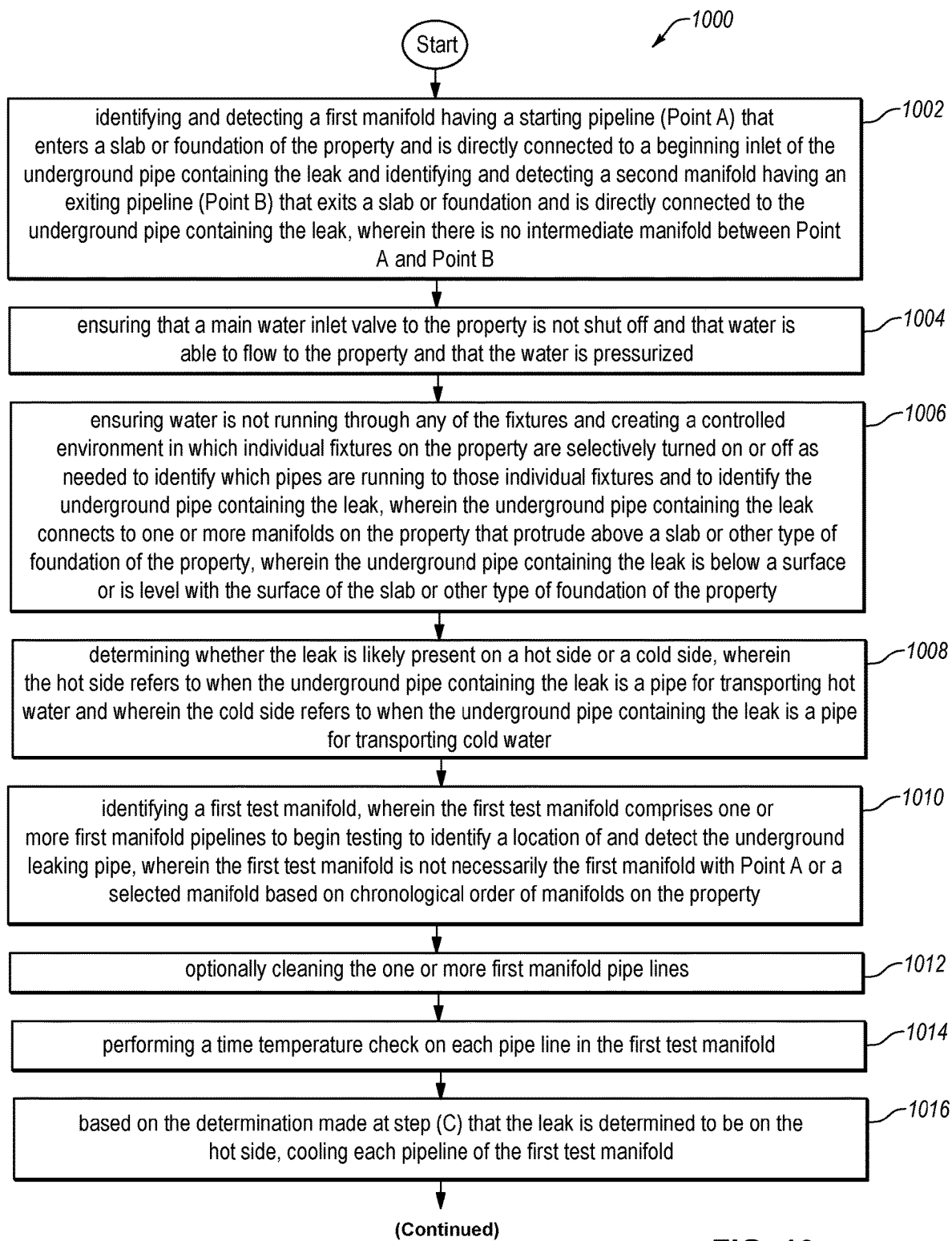
FIG. 10 is a flowchart of an exemplary method of identifying and detecting a slab leak in pipes that connect via manifolds on a property.
Figure 10:
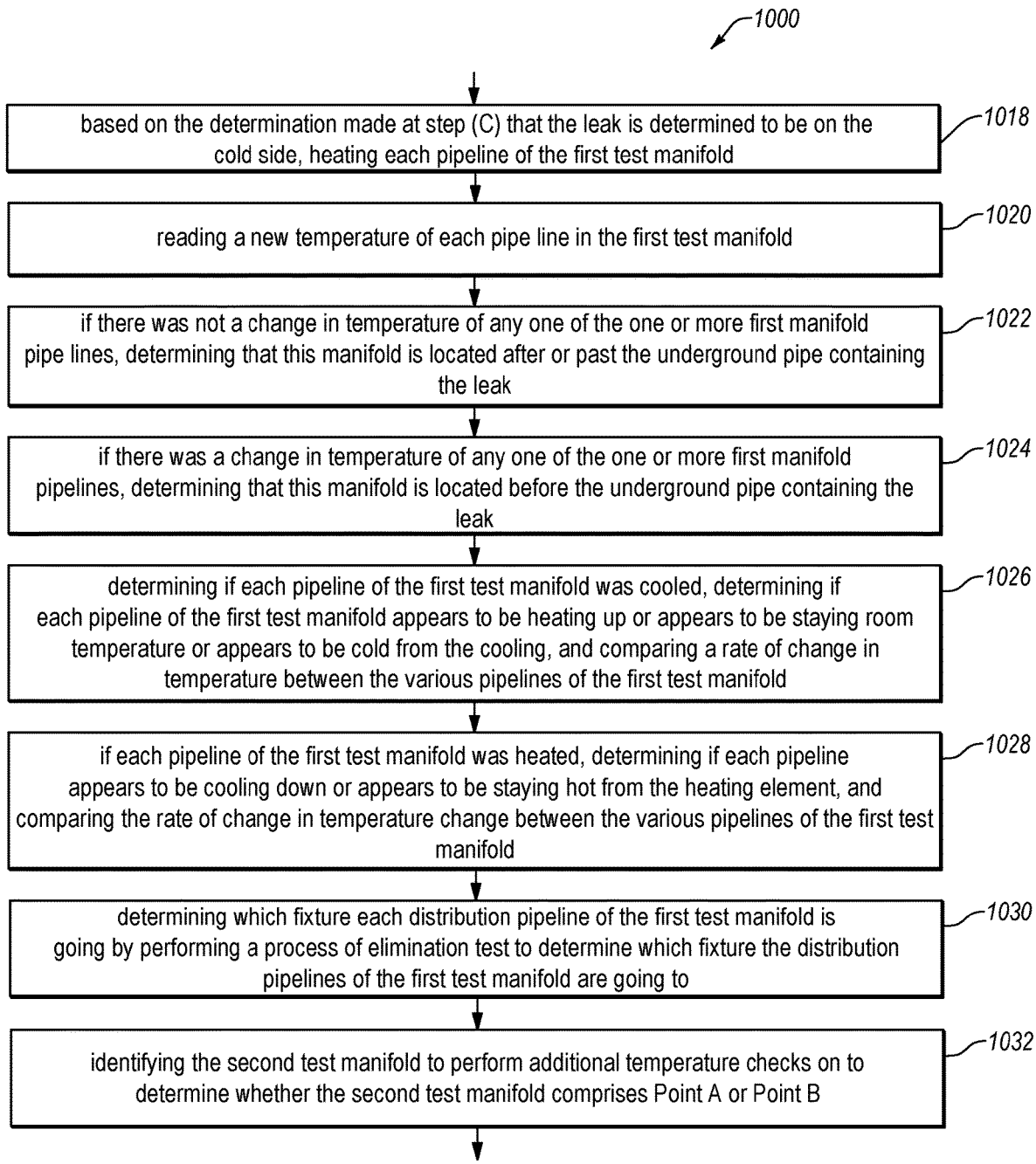
Figure 10:
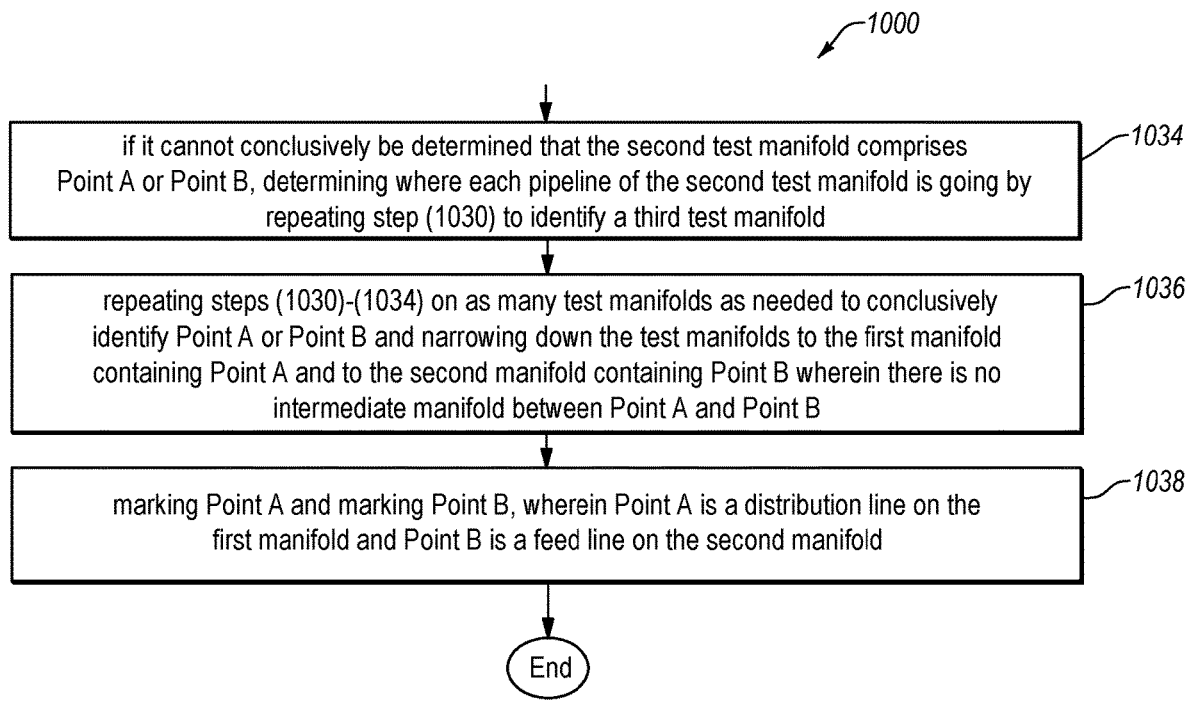

FIG. 10 shows an exemplary flowchart for implementing the method 100 as shown in FIG. 1 and as described herein according to one or more non-limiting embodiments. At step 1002, the method includes identifying and detecting a first manifold 112 having a starting pipeline (Point A 170) that enters a slab or foundation of the property and is directly connected to a beginning inlet of the underground pipe 126 containing the leak 154 and identifying and detecting a second manifold 112 having an exiting pipeline (Point B 172) that exits a slab or foundation 106 and is directly connected to the underground pipe 126 containing the leak 154, wherein there is no intermediate manifold 112 between Point A 170 and Point B 172, such that Point A 170 is a distribution line 118 that feeds water into the inlet of the underground leaking pipe 126 which allows water to flow through the underground leaking pipe 126, through the outlet of the underground leaking pipe 126 into the Point B 172 is a feedline 116 to a fixture 122 and the Point B manifold 152. Some of the water flowing through the underground leaking pipe 126 also flows out through the leak 154 so that some volume of water is lost through the leak 154.

At step 1004, the method includes ensuring that a main water inlet valve to the water main entrance 108 and to the property 104 is not shut off and that water is able to flow to the property 104 and that the water is pressurized. At step 1006, the method ensures water is not running through any of the fixtures 122 and creating a controlled environment in which individual fixtures on the property 140 are selectively turned on or off as needed to identify which pipes 114 are running to those individual fixtures 122 and to identify the underground pipe 126 containing the leak 154. The underground pipe 126 containing the leak 154 connects to one or more manifolds 112 on the property 104 that protrude above a slab or other type of foundation 106 of the property 104, wherein the underground pipe 114 containing the leak 154 is below a surface or is level with the surface of the slab or other type of foundation 106 of the property 104.

At step 1008, the method includes determining whether the leak 154 is likely present on a hot side or a cold side, wherein the hot side refers to when the underground pipe 126 containing the leak 154 is a pipe 114 for transporting hot water and wherein the cold side refers to when the underground pipe 114 containing the leak 154 is a pipe for transporting cold water. At step 1010, the method includes identifying a first test manifold 112, wherein the first test manifold 112 comprises one or more first manifold pipelines 114 to begin testing to identify a location of and detect the underground leaking pipe 126. It is noted that the first test manifold 112 is not necessarily the first manifold that will be detected to include Point A 170 nor does the first test manifold 112 have to be selected necessarily based on chronological order of distribution in the property 104. The user 102 can select anywhere to start in the property 104. In some cases, the user 102 may discover a possible Point B 172 and Point B manifold 152, and work backwards or in reverse to discover Point A 170 and the Point A manifold 150.

At step 1012, the method includes optionally cleaning the one or more first manifold pipelines 114. At step 1014, the method includes performing a time based temperature check on each pipeline 114 in the first test manifold 112. At step 1016, the method includes, based on the determination made at step (1008) that the leak is determined to be on the hot side, cooling each pipeline 114 of the first test manifold 112 using a cooling element 134. At step 1018, the method includes based on the determination made at step (1008) that the leak is determined to be on the cold side, heating each pipeline 114 of the first test manifold 112 using a heating element 132. At step 1020, the method includes reading a new temperature of each pipeline 114 in the first test manifold 112. At step 1022, if there was not a change in temperature of any one of the one or more first manifold pipelines 114, determining that this first test manifold 112 is located after or past the underground pipe 126 containing the leak 154. At step 1024, if there was a change in temperature of any one of the one or more first manifold pipelines 114, determining that this manifold 112 is located before the underground pipe 126 containing the leak 154. At step 1026, the method includes determining if each pipeline 114 of the first test manifold 112 was cooled, determining if each pipeline 114 of the first test manifold 112 appears to be heating up or appears to be staying room temperature or appears to be cold from the cooling, and comparing a rate of change in temperature between the various pipelines 114 of the first test manifold 112. At step 1028, if each pipeline 114 of the first test manifold 112 was heated, determining if each pipeline 114 appears to be cooling down or appears to be staying hot from the heating element 132, and comparing the rate of change in temperature change between the various pipelines 114 of the first test manifold 112.

At step 1030, the method includes determining which fixture 122 each distribution pipeline 118 of the first test manifold 112 is going to by performing a process of elimination test to determine which fixture 122 the distribution pipelines 118 of the first test manifold 112 are going to. At step 1032, the method includes identifying the second test manifold 112 to perform additional temperature checks on to determine whether the second test manifold 112 comprises Point A 170 or Point B 172. At step 1034, if it cannot conclusively be determined that the second test manifold 112 comprises Point A 170 or Point B 172, determining where each pipeline 114 of the second test manifold 112 is going by repeating step (1030) to identify a third test manifold 112. At step 1036, the method includes repeating steps (1030)-(1034) on as many test manifolds 112 as needed to conclusively identify Point A 170 or Point B 172 and narrowing down the test manifolds 112 to the first manifold 112 containing Point A 170 and to the second manifold 112 containing Point B 172 wherein there is no intermediate manifold between Point A 170 and Point B 172. At step 1038, the method includes marking Point A 170 and marking Point B 172, wherein Point A 170 is a distribution line 118 on the first manifold 112 (i.e., Point A manifold 150) and Point B 172 is a feedline 116 on the second manifold 112 (i.e., Point B manifold 152). Many additional advantages and uses are offered by the one or more systems described herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm and upper limit is 100 mm.

Certain terminology and derivations thereof may be used in the following description for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "coupled to" as used herein may mean a direct or indirect connection via one or more components.

What is claimed is:

1. A method for identifying an underground pipe containing a leak at a property, comprising:
identifying and detecting a first manifold having a starting pipeline (Point A) that enters a slab or foundation of the property and is directly connected to a beginning inlet of the underground pipe containing the leak and identifying and detecting a second manifold having an exiting pipeline (Point B) that exits the slab or foundation and is directly connected to the underground pipe containing the leak, wherein there is no intermediate manifold between the Point A and the Point B, further comprising:
  a. ensuring that a main water inlet valve to the property is not shut off and that potable water is able to flow to the property and that any pipes for transporting the potable water are pressurized;
  b. ensuring the potable water is not running through any of fixtures and creating a controlled environment in which individual fixtures on the property are selectively turned on or off as needed to identify which pipes are running to those individual fixtures and to identify the underground pipe containing the leak, wherein the underground pipe containing the leak connects to one or more manifolds on the property that protrude above a slab or other type of foundation of the property, wherein the underground pipe containing the leak is below a surface or is level with the surface of the slab or other type of foundation of the property;
  c. determining whether the leak is likely present on a hot side or a cold side, wherein the hot side refers to when the underground pipe containing the leak is a pipe for transporting hot water and wherein the cold side refers to when the underground pipe containing the leak is a pipe for transporting cold water;
  d. identifying a first test manifold, wherein the first test manifold comprises one or more first test manifold pipelines to begin testing to identify a location of and detect the underground leaking pipe;
  e. optionally cleaning the one or more first test manifold pipe lines;
  f. performing a time based temperature check on each pipeline of the first test manifold while a first test fixture associated with the first test manifold is off during the time based temperature check, further comprising:
    i. based on the determination made at step (c) that the leak is determined to be on the hot side, cooling each pipeline of the first test manifold by applying a cooling element to each pipeline to cool each pipeline of the first test manifold; and
    ii. based on the determination made at step (c) that the leak is determined to be on the cold side, heating each pipeline of the first test manifold by applying a heating element to each pipeline to heat each pipeline of the first test manifold;
  g. reading a new temperature of each pipe line in the first test manifold further comprising:
    i. if there was not a change in temperature of any one of the one or more first test manifold pipe lines, determining that this first test manifold is located after or past the underground pipe containing the leak; and
    ii. if there was a change in temperature of any one of the one or more first manifold pipelines, determining that this first test manifold is located before the underground pipe containing the leak, further comprising:
      1)—if each pipeline of the first test manifold was cooled, determining if one or more pipelines of the first test manifold appears to be heating up or appears to be staying room temperature or appears to be cold from the cooling, and comparing a rate of change in temperature between the various pipelines of the first test manifold, wherein if a particular pipeline of the first test manifold appears to be heating up, this is an indication that hot water is flowing through this particular pipeline toward the leak, and wherein if another pipeline appears to be cold from the cooling, this is an indication that hot water is not flowing through this pipeline towards the leak; and
      2)—if each pipeline of the first test manifold was heated, determining if each pipeline appears to be cooling down or appears to be staying room temperature or appears to be staying hot from the heating element, and comparing the rate of change in temperature change between the various pipelines of the first test manifold, wherein if a particular pipeline of the first test manifold appears to be cooling down, this is an indication that cold water is flowing through this particular pipeline toward the leak, and wherein if another pipeline appears to be hot from the heating, this is an indication that cold water is not flowing through this pipeline towards the leak;
  h. determining which pipelines of the first test manifold are distribution lines and which pipeline of the first test manifold is a feedline;
  i. determining which fixture each distribution pipeline of the first test manifold is directed to, further comprising, performing a process of elimination test to determine which fixture the distribution pipelines of the first test manifold are going to;
  j. identifying the second test manifold to perform additional temperature checks on to determine whether the second test manifold comprises the Point A or the Point B;
  k. if it cannot conclusively be determined that the second test manifold comprises the Point A or the Point B, determining where each pipeline of the second test manifold is going by repeating step i1) to identify a third test manifold;
  l. Repeating steps (h)-(k) on as many test manifolds as needed to conclusively identify the Point A or the Point B and narrowing down the test manifolds to the first manifold containing the Point A and to the second manifold containing the Point B wherein there is no intermediate manifold between the Point A and the Point B; and
  m. marking the Point A and marking the Point B, wherein the Point A is a distribution line on the first manifold and the Point B is a feed line on the second manifold.

2. The method of claim 1, wherein a time temperature test is used to identify whether a leak is before or after a tested manifold, to determine whether a pipeline is a feed line or a distribution line, to determine which fixture a distribution line on the tested manifold to is connected to and is carrying the potable water to in order to determine whether that fixture is before or after a leak, and to rule out a possibility of any intervening manifolds.

3. The method of claim 1, wherein marking the Point A and marking the Point B comprises any visible marking on the starting pipeline and the exiting pipeline without requiring written text indicating "Point A" or "Point B".

4. The method of claim 1, wherein the cooling element comprises ice cubes, cold spray, cold wash cloths, or another cooling element, and wherein the heating element comprises a torch or heat gun or another heating element.

5. The method of claim 1, wherein repairs on the property comprise replacing all or a portion of the underground leaking pipe or rerouting a new set of pipes above ground, wherein aboveground comprises above a surface of the slab or foundation of the property.

6. The method of claim 5, wherein rerouting the new set of pipes above ground further comprises rerouting the new set of pipes to the Point A and to the Point B.

7. The method of claim 5, wherein replacing all or a portion of the underground leaking pipe further comprises accessing the underground pipe containing the leak in order to repair all or the portion of the underground pipe.

8. The method of claim 1, wherein determining which pipelines are distribution lines and which pipeline is a feedline in step (h) further comprises:
   determining whether all the pipelines of the first test manifold are of a same size diameter;
   if all of the pipelines of the first test manifold are of the same size diameter, turning on the first fixture and performing temperature checks to determine which pipeline is the feedline and which pipelines are the distribution lines;
   if any of the pipelines of the first test manifold have a larger size diameter, determining if there is only one pipeline having the larger size diameter or if there are multiple larger sized diameter pipelines;
   if only one of the pipelines has the larger size diameter, safely identifying that pipeline as the feedline; and
   if there are multiple larger sized diameter pipelines, performing temperature checks and turning on the first fixture to accurately identify the feedline.

9. The method of claim 1, wherein reading a new temperature in step (g) further comprises using touch, vision, or temperature testing equipment.

10. The method of claim 9, wherein temperature testing equipment further comprises using thermometers, cameras, or temperature readers.

11. The method of claim 9, wherein using touch further comprises:
   feeling each pipeline in the first test manifold with a user's hands or other part of a user's body to assess the new temperature of each pipeline in the first test manifold.

12. The method of claim 1, wherein identifying a first test manifold further comprises:
   checking for any clear signs of where the leak could be located and proceeding to an identified location on the property having fixtures and manifolds closest to a location of the any clear signs, wherein the any clear signs comprise flooding, pooling water, warm floors, hissing noises that can be heard with a user's bare ears, or a loud sound detected using audio equipment.

13. The method of claim 1, further comprising using audio equipment to identify the first test manifold.

14. The method of claim 13, further comprising, listening for a loud hissing side on the hot side or the cold side using the audio equipment.

15. The method of claim 1, wherein optionally cleaning each pipeline in step (e) further comprises using a file, emery cloth, a piece of sand paper, wire brush, or other tool to clean off any sludge, slime, concrete, plastic or any other unwanted elements that interfere with obtaining an accurate temperature reading.

16. The method of claim 1, further comprising utilizing a utility locator to locate pipes located underground the slab or the foundation in order to determine the first test manifold, the second test manifold, or any other manifold on the property.

17. The method of claim 1, wherein marking the Point A and/or the Point B further comprises using a visually discernible marking element.

18. The method of claim 1, wherein determining whether the leak is likely present on the hot side or the cold side further comprises checking a hot water exit of any hot water heaters on the property to determine if the hot water exit is hot or cold and identifying that the leak is present on the hot side if the hot water exit of the any hot water heaters on the property are hot after also testing and ensuring that the hot water heater is not out of hot water.

19. The method of claim 1, wherein determining whether the leak is likely present on the hot side or the cold side further comprises turning off the hot water heater and temperature testing the main water inlet to determine if the leak is likely present on the hot side or the cold side.

20. The method of claim 1, wherein the process of elimination test further comprises:
   performing a time based temperature test on the distribution lines of a test manifold and selectively turning on and off an identified fixture to determine whether a particular distribution pipeline of the test manifold transports water to the identified fixture;
   after identifying that the particular distribution pipeline does transport water to the identified fixture, proceeding to the identified fixture and locating an additional manifold for the identified fixture;
   testing whether the additional manifold is before or after the leak using time based temperature testing;
   identifying which pipelines of the additional manifold are distribution lines and which pipeline is a feedline using time based temperature testing; and
   determining whether the distribution lines lead to a first manifold that includes the Point A or determining whether the feedline at a second manifold that includes the Point B or determining that the additional manifold comprises the Point A or the Point B.

21. The method of claim 1, wherein either the Point A is located before the Point B or the Point B is located before the Point A.

* * * * *